(12) United States Patent
Sasaki et al.

(10) Patent No.: US 9,911,038 B2
(45) Date of Patent: Mar. 6, 2018

(54) SURVEY DATA PROCESSING DEVICE, SURVEY DATA PROCESSING METHOD, AND PROGRAM THEREFOR

(71) Applicant: KABUSHIKI KAISHA TOPCON, Itabashi-ku (JP)

(72) Inventors: Takeshi Sasaki, Itabashi-ku (JP); Tetsuji Anai, Itabashi-ku (JP); Hitoshi Ootani, Itabashi-ku (JP); Nobuo Kochi, Odawara (JP)

( * ) Notice: Subject to any disclaimer, the term of this patent is extended or adjusted under 35 U.S.C. 154(b) by 52 days.

(21) Appl. No.: 15/007,380

(22) Filed: Jan. 27, 2016

(65) Prior Publication Data
US 2016/0217582 A1    Jul. 28, 2016

(30) Foreign Application Priority Data
Jan. 27, 2015    (JP) ................................ 2015-013358

(51) Int. Cl.
*G06K 9/00* (2006.01)
*G06K 9/20* (2006.01)
(Continued)

(52) U.S. Cl.
CPC ......... *G06K 9/0063* (2013.01); *G06K 9/2081* (2013.01); *G06T 7/33* (2017.01);
(Continued)

(58) Field of Classification Search
None
See application file for complete search history.

(56) References Cited

U.S. PATENT DOCUMENTS

| 9,384,402 B1* | 7/2016 | Furman | G06K 9/00805 |
| 9,767,369 B2* | 9/2017 | Furman | G06K 9/00805 |

(Continued)

FOREIGN PATENT DOCUMENTS

| EP | 2 309 225 A1 | 4/2011 |
| JP | 2013-96745 | 5/2013 |
| WO | WO 2014/171988 A2 | 10/2014 |

OTHER PUBLICATIONS

Extended European Search Report dated Jun. 21, 2016 in Patent Application No. 16152525.8.
(Continued)

*Primary Examiner* — Nancy Bitar
(74) *Attorney, Agent, or Firm* — Oblon, McClelland, Maier & Neustadt, L.L.P.

(57) ABSTRACT

The efficiency of work for identifying reference points included in photographed images is improved. A survey data processing device includes a data receiving unit 103 that receives data of two still images, an operation information receiving unit 104 that receives a selection of reference points among multiple reference points which are included in both of the two still images and have known location information, an exterior orientation parameter calculating unit 106 that calculates exterior orientation parameters of a camera, a coordinate integrating unit 110 for obtaining an integrated coordinate system for describing both the locations of an unselected reference point and the camera, a back-projected image generating unit 111 for generating a back-projected image by back-projecting the unselected reference point in the integrated coordinate system, and a target position estimating unit 112 that estimates a position of the unselected reference point in a still image.

10 Claims, 13 Drawing Sheets

(51) Int. Cl.
    *G06T 7/33*      (2017.01)
    *G06T 7/73*      (2017.01)
    *G06T 7/55*      (2017.01)

(52) U.S. Cl.
    CPC .............. *G06T 7/55* (2017.01); *G06T 7/74* (2017.01); *G06T 2200/24* (2013.01); *G06T 2207/10016* (2013.01); *G06T 2207/10032* (2013.01); *G06T 2207/20101* (2013.01); *G06T 2207/30181* (2013.01); *G06T 2207/30244* (2013.01)

(56) References Cited

U.S. PATENT DOCUMENTS

| | | | |
|---|---|---|---|
| 9,774,764 B2* | 9/2017 | Tsue | H04N 1/648 |
| 2011/0096957 A1* | 4/2011 | Anai | G01C 11/10 |
| | | | 382/106 |
| 2015/0371431 A1* | 12/2015 | Korb | G06T 9/00 |
| | | | 382/113 |

OTHER PUBLICATIONS

P. Barry et al., "RPAS Photogrammetry", Photogrammetry, XP055279678, Aug. 7, 2013, pp. 37-41, Retrieved from the Internet: URL: https://ec.europa.eu/eusurvey/files/8309772a-1ebb-48b7-980a-40db1ee66efb [retrieved on Jun. 10, 2016].

\* cited by examiner

Error point

Error reference point for measurement

SURVEY DATA PROCESSING DEVICE, SURVEY DATA PROCESSING METHOD, AND PROGRAM THEREFOR

BACKGROUND OF THE INVENTION

Technical Field

The present invention relates to a surveying technique.

Background Art

For example, a technique for obtaining a three-dimensional model of the topography of an object based on image data (three-dimensional topographic data in which the topography of the object is modeled as electronic data) is publicly known (for example, refer to Japanese Unexamined Patent Application Laid-Open No. 2013-96745). The image data may be obtained by photographing a civil engineering worksite or the like from the air. In this technique, work is required to add actual dimensions to the obtained three-dimensional model. In this work, reference points included in each of several tens of, to several hundreds of, or even more, still images need be found and be matched to each other among the still images.

A technique for automatically detecting the reference points by software processing has also been researched. In this technique, a step of attaching a target on a reference point is performed so as to easily detect the reference point by software processing. However, the automatic detection of the target in an image tends to yield errors, and therefore, in actual practice, an operator needs to monitor each of the still images one by one by eye and enlarge or reduce the image and identify the position of a marker in the image. This working procedure should be performed on each of several tens of, to several hundreds of, or more, still images, and this is thereby complicated and inefficient.

SUMMARY OF THE INVENTION

In view of these circumstances, it is an object of the present invention to provide a technique for improving efficiency of work for identifying reference points included in photographed images.

A first aspect of the present invention provides a survey data processing device including a data receiving unit, a selection receiving unit, an exterior orientation parameter calculating unit, a coordinate integrating unit, a back-projected image generating unit, and an estimating unit. The data receiving unit receives data of a first still image and data of a second still image. The first still image and the second still image are obtained by photographing the same object by a camera at a first timing and at a second timing, which is later than the first timing, respectively, while the camera travels. The selection receiving unit receives a selection of reference points from among multiple reference points, which are included in both the first still image and the second still image and have known location information. The exterior orientation parameter calculating unit calculates exterior orientation parameters of the camera at the first timing and exterior orientation parameters of the camera at the second timing based on the selected reference points. The coordinate integrating unit integrates a coordinate system of an unselected reference point and a coordinate system of a location of the camera, which is calculated by the exterior orientation parameter calculating unit, so as to obtain an integrated coordinate system for describing the location of the unselected reference point and the location of the camera in the same coordinate system. The back-projected image generating unit back-projects the unselected reference point in the integrated coordinate system, to the location of the camera at a specific position, thereby obtaining a back-projected image. The estimating unit estimates a position of the unselected reference point in a still image that is photographed by the camera at the specific position, based on the position of the unselected reference point in the back-projected image on a screen.

According to the first aspect of the present invention, a reference point, which is not selected by an operator (user), is estimated by using a back-projected image. Therefore, compared with an operation in a case of searching for reference points by eye by repeated enlargement and reduction of still images, the efficiency of the operation for finding reference points is improved.

According to a second aspect of the present invention, in the first aspect of the present invention, the survey data processing device may be configured to perform processing for setting a search area by enlarging an area containing the location of the unselected reference point, which is estimated by the estimating unit, in at least one of the first still image and the second still image. According to the second aspect of the present invention, by setting the search area by enlarging a part of the still image, the area for finding reference points is limited, whereby the efficiency of the operation for finding reference points is improved.

According to a third aspect of the present invention, in the second aspect of the present invention, a target may be arranged at the location of the unselected reference point and may be detected from the search area.

According to a fourth aspect of the present invention, in the second or the third aspect of the present invention, the survey data processing device may be configured to perform processing for notification of an error in the detection when the detection is not performed normally.

According to a fifth aspect of the present invention, in the fourth aspect of the present invention, the survey data processing device may be configured to perform control of displaying the search area on the screen when the detection is not performed normally.

According to a sixth aspect of the present invention, in any one of the second to the fifth aspects of the present invention, the survey data processing device may be configured to perform control of display of multiple search areas on the screen by thumbnail images as reduced images and to perform control of displaying an enlarged image of the corresponding search area on the screen when one of the reduced images is selected.

According to a seventh aspect of the present invention, in any one of the second to the sixth aspects of the present invention, the survey data processing device may also include a judging unit that judges a target as an erroneous target when a difference between known location data of the target detected in the search area and location data of the target, which is calculated from multiple still images by an intersection method, satisfies one or more predetermined conditions.

Under ideal conditions in which there is no occurrence of errors and no margin of error, location information of a target, which is preliminarily obtained, corresponds with location information of the same target, which is calculated by an intersection method based on image analysis of the target. Otherwise, if there is any problem in processing for identifying the location of a target or identifying the location using still images, known location data of a detected target differs from location data of the same target, which is calculated from multiple still images by an intersection method. According to the seventh aspect of the present invention, an erroneous target is detected by evaluating this difference.

According to an eighth aspect of the present invention, in the seventh aspect of the present invention, the survey data processing device may also include an error-type judging unit that judges the type of error occurring in the erroneous target. When an erroneous target is detected, there may be cases in which an operator desires to know the likely way the error can be corrected so that only data relating to the erroneous target will be deleted or be corrected, a part of the information should be obtained again or be reviewed, the procedure should be returned to the relatively former step so as to reperform the measurement because there may be a problem affecting all of the calculations, etc. As described later, the error is classified and is typified. In addition, the type of the error can be anticipated to some degree by examining parameters used in judgment of the erroneous target. The operator can determine the above-described likely way by determining the type of error.

According to a ninth aspect of the present invention, in the eighth aspect of the present invention, the difference may be calculated with respect to multiple targets, and a predetermined specific type of error may be selected when the variation in the differences of the multiple targets satisfies a predetermined condition. In this case, the difference represents a difference between known location data of a target, which is detected from the search area, and location data of the target, which is calculated from multiple still images by the intersection method.

According to a tenth aspect of the present invention, in the eighth or the ninth aspect of the present invention, a predetermined specific type of error may be selected based on change in the difference on a time axis.

According to an eleventh aspect of the present invention, in any one of the eighth to the tenth aspects of the present invention, the survey data processing device may control display of the type of error on the screen.

A twelfth aspect of the present invention provides a survey data processing method including: receiving data of a first still image and a second still image, which are obtained by photographing the same object by a camera at a first timing and a second timing that is later than the first timing, respectively, while the camera travels, receiving a selection of reference points among multiple reference points, which are included in both of the first still image and the second still image and have known location information, calculating exterior orientation parameters of the camera at the first timing and exterior orientation parameters of the camera at the second timing based on the selected reference points, integrating a coordinate system of the unselected reference point and a coordinate system of a location of the camera, of which exterior orientation parameters are calculated, so as to obtain an integrated coordinate system for describing the location of the unselected reference point and the location of the camera in the same coordinate system, generating a back-projected image by back-projecting the unselected reference point in the integrated coordinate system, to the location of the camera at a specific location, and estimating a position of the unselected reference point in a still image, which is photographed by the camera at the specific location, based on the position of the unselected reference point in the back-projected image on a screen.

A thirteenth aspect of the present invention provides a computer program product including a non-transitory computer-readable medium storing computer-executable program codes. The computer-executable program codes includes program code instructions for; receiving data of a first still image and a second still image, which are obtained by photographing the same object by a camera at a first timing and a second timing that is later than the first timing, while the camera travels, receiving selection of reference points among multiple reference points, which are photographed in both of the first still image and the second still image and have known location information, calculating exterior orientation parameters of the camera at the first timing and exterior orientation parameters of the camera at the second timing based on the selected reference points, integrating a coordinate system of the unselected reference point and a coordinate system of a location of the camera, of which exterior orientation parameters are calculated, so as to obtain an integrated coordinate system for describing the location of the unselected reference point and the location of the camera in the same coordinate system, generating a back-projected image by back-projecting the unselected reference point in the integrated coordinate system, to the location of the camera at a specific location, and estimating a position of the unselected reference point in a still image, which is photographed by the camera at the specific location, based on the position of the unselected reference point in the back-projected image on a screen.

According to the present invention, a technique for improving the efficiency of the work for identifying reference points included in photographed images is obtained.

PREFERRED EMBODIMENTS OF THE INVENTION

1. First Embodiment

Outline

Figure 1:
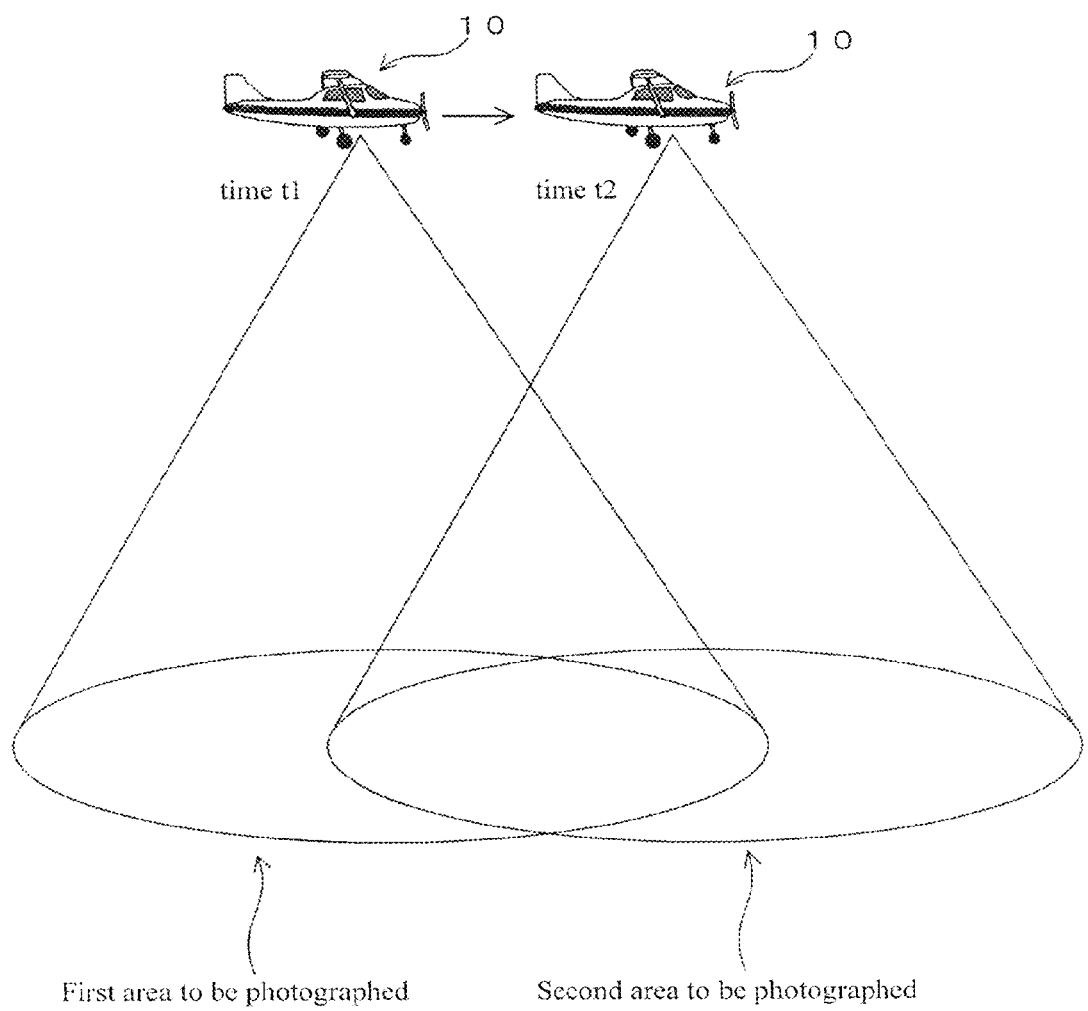
FIG. 1 is a conceptual diagram showing photographing conditions.

The principle of a processing performed in an embodiment will be briefly described hereinafter. FIG. 1 conceptually shows a principle of measurement. In this embodiment, an autonomously flying unmanned air vehicle (UAV)

10 with a piece of equipment mounted with an image photographing camera is used. The UAV 10 is equipped with a GNSS unit (location identifying unit using a navigation satellite) and an IMU (inertial navigation unit), and it is capable of autonomous flight, but the precision of the autonomous flight is not sufficient for generating a three-dimensional model (described later). Naturally, although the costs may be higher, a vehicle equipped with a high precision GNSS unit and a high precision IMU may be used. It should be noted that the GNSS unit and the IMU of the UAV are not essential to generate the three-dimensional model in this embodiment. In addition, a manned aircraft may also be used instead of the UAV.

The UAV 10 consecutively photographs the ground surface while flying. Specifically, the UAV 10 consecutively performs processing of photographing a first still image at time t1, a second still image at time t2, and a third still image at time t3 while flying. The interval of the photographing is determined as needed, and for example, it may be 2 seconds. Alternatively, a moving image may be photographed, and frame images constructing the moving image may be used as still images. That is, a moving image is constructed of multiple frame images that are aligned on a time axis, such as of a first frame image photographed at time t1, a second frame image photographed at time t2, and so on, and therefore, the frame images may be used as still images in this embodiment.

Since the above photographing is performed while flying, numerous still images, in which the position of the viewpoint is slightly changed and the area including a photographing object is slightly changed, are obtained. Multiple targets, of which three-dimensional locations are identified by a total station or the like, are preliminarily placed on the ground surface to be photographed. When two still images, which are photographed in a consecutive manner or at very short time intervals, are compared with each other, the two still images contain overlapping portions, at which the multiple targets are photographed. In other words, a flight plan and the condition of placing the targets are determined so that the multiple same targets are photographed in the two still images.

An operator selects two such still images from obtained image data and selects multiple (at least four) common targets that are included in both of the still images by a manual operation. This working step may be performed by operating a personal computer or a tablet computer (tablet terminal), for example. Here, by using the relationships of the multiple targets, which have identified three-dimensional locations and are included in both of the two still images, exterior orientation parameters (three-dimensional location and attitude) of the camera mounted on the UAV 10 at the time when the camera photographed each of the two still images are calculated by a backward intersection method.

Figure 4:
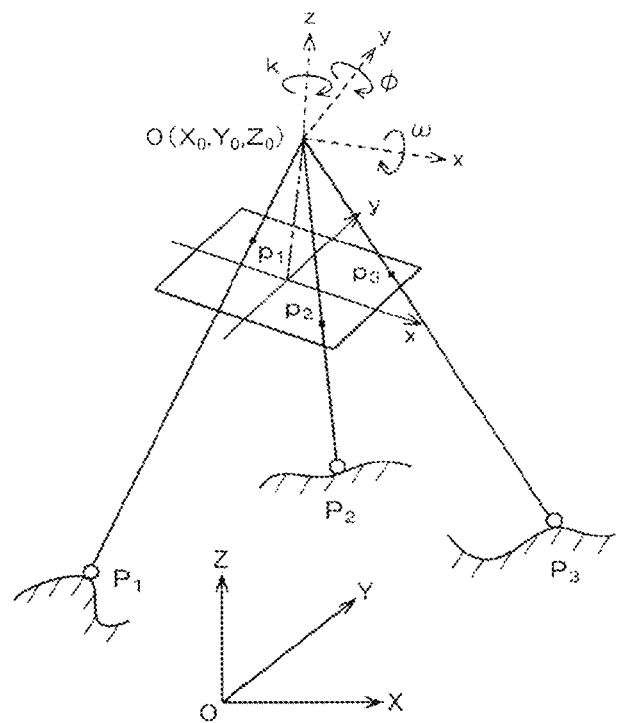
FIG. 4 is an explanatory diagram showing a principle of a backward intersection method.

FIG. 4 shows a principle of the backward intersection method. The backward intersection method is a method of observing directions from an unknown point to at least three known points and calculating the position of the unknown point as the intersection poatf these directional lines. As the backward intersection method, a single photo orientation or a DLT method (Direct Linear Transformation Method) may be used. The details of the intersection method may be found in "Technology of Positioning Solutions" (published by DENKISHOIN on April, 2010) on pages 182 and 184. In addition, a specific example of the calculation method relating to the intersection method is disclosed in Japanese Unexamined Patent Application Laid-Open No. 2013-186816.

Assuming that the photographing time of a first still image is t1 and the photographing time of a second still image is t2, a three-dimensional location and an attitude of the UAV 10 (camera) at t1 and a three-dimensional location and an attitude of the UAV 10 (camera) at t2 are calculated. In this processing, the locations of the targets selected by the operator are used as reference points which are clearly identified, and a three-dimensional location and an attitude of the camera at the time when the camera photographed each of the two still images are calculated by the backward intersection method, based on three-dimensional coordinates and image coordinate values in the still image of the reference points.

The method of calculating the exterior orientation parameters may be simply described as follows. The points $P_1$ to $P_3$ shown in FIG. 4 represent reference points of which locations are clearly identified, and the points $p_1$ to $p_3$ have image coordinate values thereof. A line connecting the points $P_1$ and $p_1$, a line connecting the points $P_2$ and $p_2$, and a line connecting the points $P_3$ and $p_3$ are set, and an intersection poat of the three lines is obtained as the location of the camera. In addition, an extending direction of a line connecting the poat and a center of the image is an optical axis of the camera. Thus, exterior orientation parameters (location and attitude) of the camera at the time when the camera photographed the image are calculated by using the image including the multiple reference points of which locations are identified.

Thereafter, by image processing, feature points are extracted from the first still image and the second still image, and matching relationship of the feature points between the two still images are calculated. The matching relationship of the feature points between the two still images may be identified by template matching.

Figure 5:
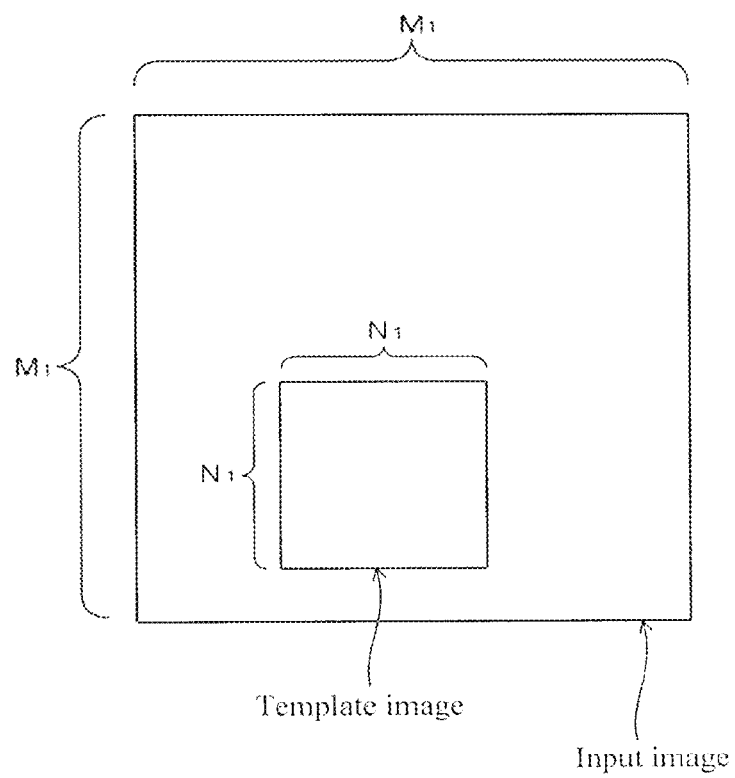
FIG. 5 is an explanatory diagram showing a principle of template matching.

As the template matching, a SSDA method (Sequential Similarity Detection Algorithm), a cross-correlation coefficient method, or the like may be used. An example of the template matching will be described below. The template matching is a method in which coordinate data of images in two coordinate systems are compared with each other and a matching relationship between the two images is calculated by correlation relationship between the coordinate data. In the template matching, the matching relationship between feature points of two images seen from different viewpoints is calculated. FIG. 5 is an explanatory diagram for explaining the principle of the template matching. In this method, as shown in FIG. 5, a template image of $N_1 \times N_1$ pixels is moved on a searching range $(M_1-N_1+1)^2$ within an input image of $M_1 \times M_1$ pixels which is larger than the template image, and an upper left position of the template image is calculated so that the cross-correlation function $C(a, b)$ denoted by the following First Formula represents the maximum value (that is, the correlation degree becomes maximum).

First Formula $$C(a, b) = \sum_{m_1=0}^{N_1-1} \sum_{n_1=0}^{N_1-1} \frac{\{I_{(a,b)}(m_1, n_1) - \bar{I}\}\{T(m_1, n_1) - \bar{T}\}}{\sqrt{I_{\sigma ab} T_\sigma}}$$

Here, $\bar{I} = \dfrac{1}{N_1^2} \displaystyle\sum_{m_1=0}^{N_1-1} \sum_{n_1=0}^{N_1-1} I_{(a,b)}(m_1, n_1)$ $\bar{T} = \dfrac{1}{N_1^2} \displaystyle\sum_{m_1=0}^{N_1-1} \sum_{n_1=0}^{N_1-1} T(m_1, n_1)$ $I_{\sigma ab} = \dfrac{1}{N_1^2} \displaystyle\sum_{m_1=0}^{N_1-1} \sum_{n_1=0}^{N_1-1} \{I_{(a,b)}(m_1, n_1) - \bar{I}\}^2$ $T_\sigma = \dfrac{1}{N_1^2} \displaystyle\sum_{m_1=0}^{N_1-1} \sum_{n_1=0}^{N_1-1} \{T(m_1, n_1) - \bar{T}\}^2$ $I_{(a,b)}(m_1, n_1)$: Local image of input image $T(m_1, n_1)$: Template image The above processing is performed by changing the magnification of the one image and rotating the one image. In a condition in which the correlation degree is the maximum, the matched region of both images is calculated, and feature points in this region are extracted, whereby matching points are detected.

By using the template matching, a portion that matches between two compared images can be identified, and the matching relationship between the two images can be calculated. In this method, the relative positional relationship between the two images is calculated so that the degree of the correlation relationship between the two images is the maximum. The correlation relationship between the two images is calculated based on the feature points of the two images.

Figure 6:
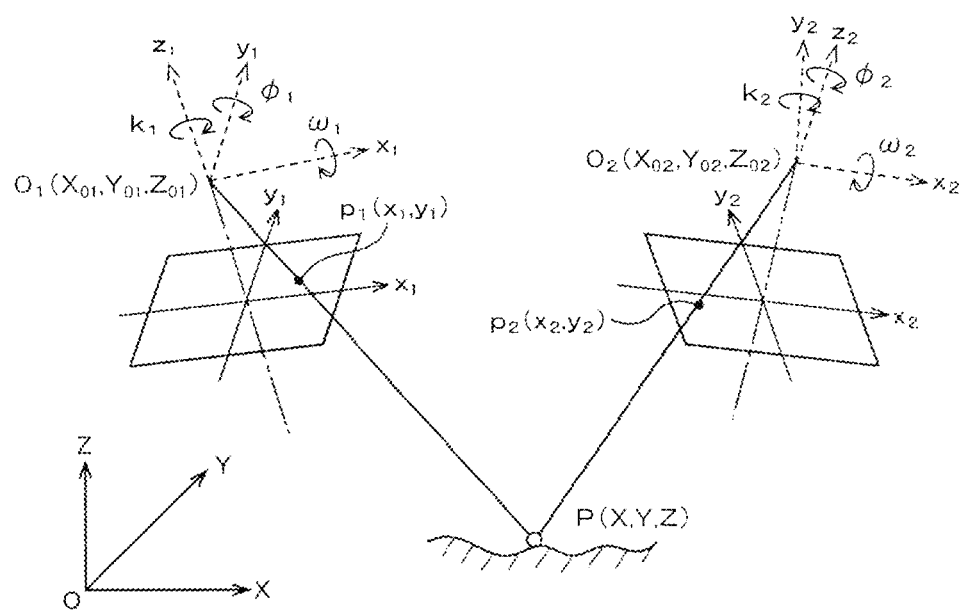
FIG. 6 is an explanatory diagram showing a principle of a forward intersection method.

Here, since the exterior orientation parameters (location and attitude) of the camera at each of times t1 and t2 are previously calculated, three-dimensional locations of the feature points, of which locations are still not known, are calculated by using a forward intersection method. FIG. 6 shows a principle of the forward intersection method. The forward intersection method is a method of observing directions from multiple known points (in the case shown in FIG. 6, two points ($O_1$, $O_2$)) to an unknown point P and calculating the position of the unknown point P as the intersection poatf these directional lines. Thus, three-dimensional coordinates of the targets and the feature points in the first still image and in the second still image are obtained.

The coordinate system of the camera and the coordinate system of the reference point are the same (for example, a coordinate system used in a GNSS), and therefore, these coordinate systems can be integrated. The integrated coordinate system can describe positions of targets (reference points), which are selected or detected at this stage, and positions of unidentified targets (reference points), which are still not extracted and have known location information.

Figure 3:
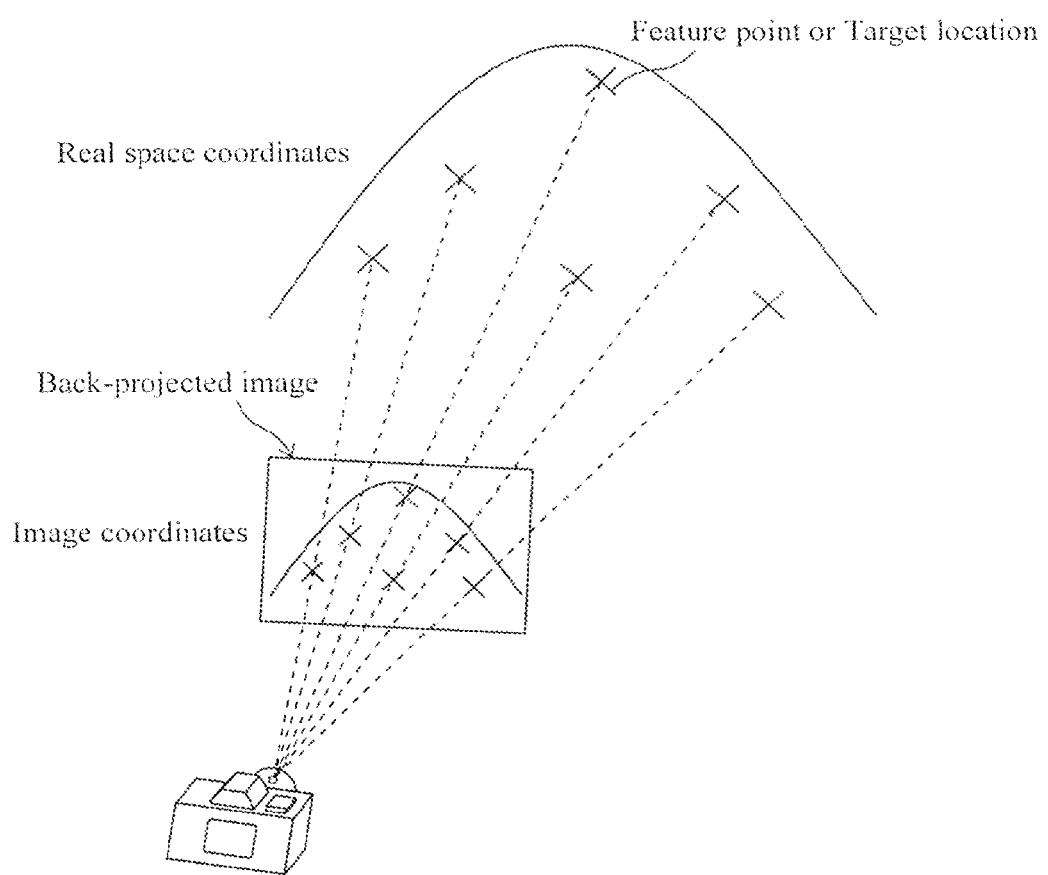
FIG. 3 is an explanatory diagram showing a principle of a method for obtaining a back-projected image.

By back-projecting the integrated coordinate system to the location of the camera at the time when the camera photographed a specific still image, a back-projected image, which can describe positions of unidentified targets (positions of reference points) in the specific still image, is obtained by the principle shown in FIG. 3.

In this embodiment, an enlarged image is prepared by enlarging the position of the unidentified target in the back-projected image. Then, the unidentified target is searched for in the enlarged image by using an image identifying function using software. If the unidentified target is detected, the identification code of the unidentified target is obtained from the image, and data of a three-dimensional location of the unidentified target stored in a data base is retrieved therefrom.

If three-dimensional coordinates of the unidentified target cannot be obtained, the operator observes the image of the enlarged area by eye and finds a target. In this case, since the search area is limited, the working step for searching by eye is easy compared with a case in which the search area is not limited. Thus, a target, which is not selected by the operator first, is identified in the first still image and in the second still image, and location information thereof is obtained.

Next, the second still image is compared with a third still image. As the third still image, an image including the feature point and the target, which are also included in the second still image, is selected. At this time, a location and an attitude of the camera at the time when the camera photographed the third still image are unknown. However, the three-dimensional locations of the target and the feature point, which are included in both of the second still image and the third still image and are already selected, are previously calculated relating to the second still image. Therefore, the location and the attitude of the camera at the time when the camera photographed the third still image can be calculated by the backward intersection method shown in FIG. 4.

After the location and the attitude of the camera at the time when the camera photographed the third still image are calculated, as in the case of the processing relating to the first still image and the second still image, a back-projected image relating to the third still image is generated, and a next unidentified target relating to the third still image is searched for. Then, other feature points are extracted in the third still image, and three-dimensional locations thereof are calculated.

The above processing is performed on a fourth still image, a fifth still image, and subsequent images, whereby a true scale is obtained by using the multiple targets, and a three-dimensional model constructed of numerous feature points (three-dimensional model of a measured object) is obtained. The above are a description of the principles and an outline of the processing performed in this embodiment. Here, although a case of generating a three-dimensional model of a ground surface is described, the object is not limited to the ground surface, and it may be an artificial structure such as a building and the like.

Structure of Hardware

Figure 2:
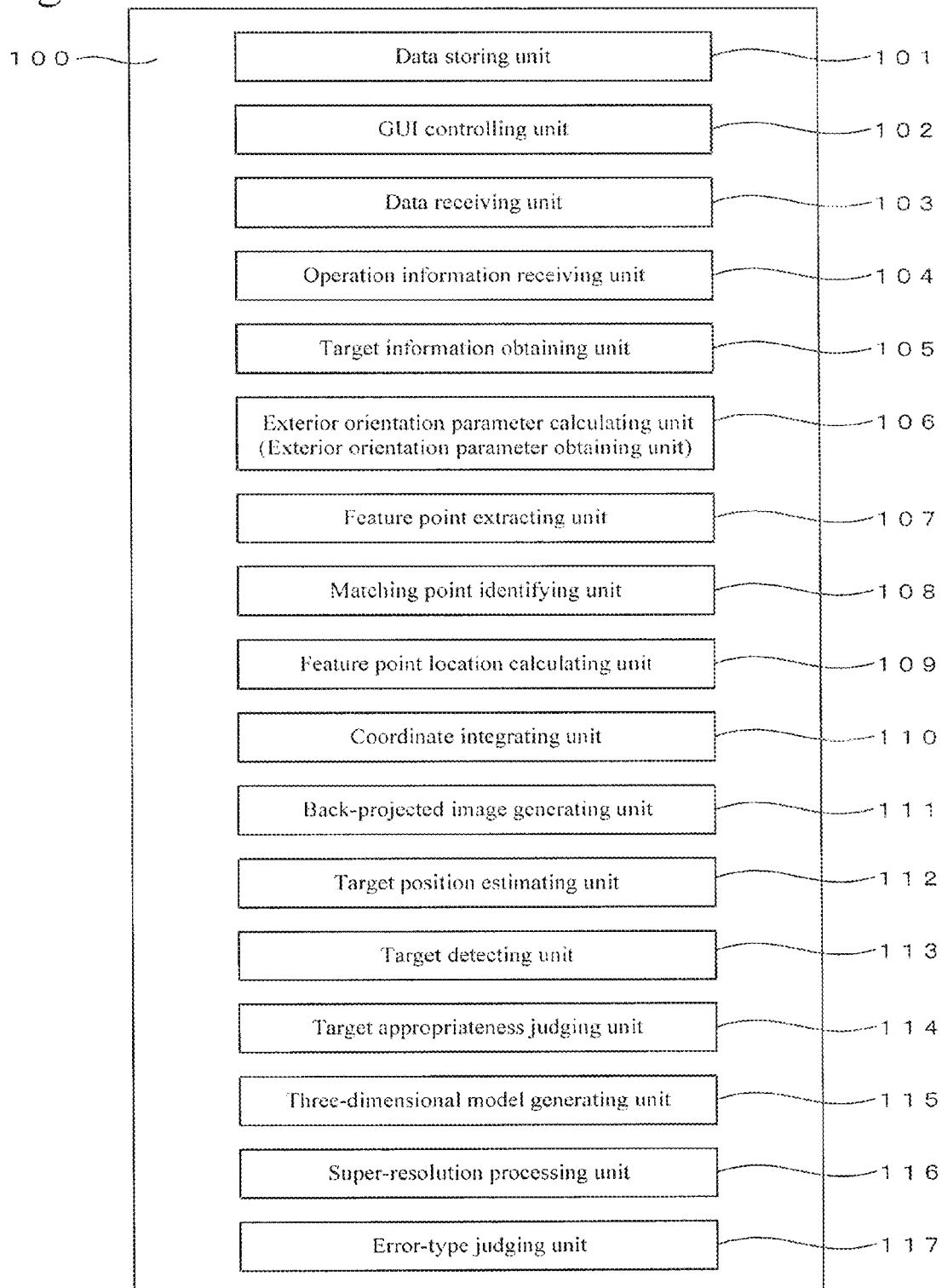
FIG. 2 is a block diagram of an embodiment.

FIG. 2 shows a block diagram of a survey data processing device 100 using the present invention. The survey data processing device 100 is hardware that executes the above processing. The survey data processing device 100 functions as a computer and includes a CPU, a solid electronic memory, a hard disk storage unit, various types of interfaces, and other arithmetic elements as necessary. FIG. 2 shows each kind of functioning unit, which are understood as functions. One or more of each kind of the functioning units shown in FIG. 2 may be constructed of software or may be constructed of dedicated hardware.

For example, the survey data processing device 100 may be constructed of dedicated hardware, or the functions of the functioning units shown in FIG. 2 may be performed by software by using a general purpose computer. In the case of using a general purpose computer, thumbnail images and enlarged images of the vicinity of estimated locations of targets, which are described later, are displayed on a display provided to or connected to the computer, and the operator performs various kinds of operations by using a UI (User Interface) that can be used in the computer. In addition, at least some of the functions of the survey data processing device 100 may be performed by a tablet computer (tablet terminal) or a smartphone.

The survey data processing device 100 includes a data storing unit 101, a GUI controlling unit 102, a data receiving unit 103, an operation information receiving unit 104, a target information obtaining unit 105, an exterior orientation parameter calculating unit (exterior orientation parameter obtaining unit) 106, a feature point extracting unit 107, a matching point identifying unit 108, a feature point location calculating unit 109, a coordinate integrating unit 110, a back-projected image generating unit 111, a target position estimating unit 112, a target detecting unit 113, a target appropriateness judging unit 114, a three-dimensional model generating unit 115, a super-resolution processing unit 116, and an error-type judging unit 117.

The data storing unit 101 stores identification information and three-dimensional location data of targets to be used. The data storing unit 101 also stores various kinds of data necessary for operating the survey data processing device 100. The GUI controlling unit 102 controls operation of a GUI (Graphical User Interface) on a display for displaying results of the processing of the survey data processing device 100. The operator can manually operate selection, confirmation, etc. of the targets by operating the GUI on the display. Various types of images (described later) are displayed due to the function of the GUI controlling unit 102.

The data receiving unit 103 receives image data of still images that are photographed by the camera mounted on the UAV. In the image data, each of the still images is linked with the time when it was photographed. The operation information receiving unit 104 receives contents instructed by the operator. For example, information relating to the operation content of the operator using the GUI is received by the operation information receiving unit 104.

The target information obtaining unit 105 retrieves location information of a target selected by the operator, from the data storing unit 101, and obtains location information of a target detected by the target detecting unit 113 (described later).

The exterior orientation parameter calculating unit (exterior orientation parameter obtaining unit) 106 calculates a three-dimensional location and an attitude of the camera at the time when the camera photographed a still image by using the backward intersection method shown in FIG. 4. In this calculation, three-dimensional coordinates of at least one kind of targets, which are included in the still image photographed by the camera mounted on the UAV, and feature points extracted from the still image, are used. Alternatively, the exterior orientation parameter calculating unit (exterior orientation parameter obtaining unit) 106 may obtain location data and attitude data, which are measured by the GNSS unit and the IMU provided to the UAV.

The feature point extracting unit 107 extracts feature points from the still images. As the feature points, points that can be differentiated from the surroundings, for example, edge portions and portions having colors that are different from surroundings, are extracted. The extraction of the feature points is performed by software processing using a differential filter such as a Sobel filter, a Laplacian filter, a Prewitt filter, a Roberts filter, or the like.

The matching point identifying unit 108 identifies matching relationships between the feature points, which are extracted respectively from two still images. That is, the matching point identifying unit 108 performs processing of identifying feature points, which are extracted from one still image, with feature points in the other still image. This processing of identifying the matching relationships of the feature points is performed by the template matching shown in FIG. 5, for example. The feature point location calculating unit 109 calculates three-dimensional coordinates of the feature points, of which matching relationships are identified between two still images, by using the forward intersection method shown in FIG. 6.

The coordinate integrating unit 110 integrates the coordinate system of the camera location and the coordinate system of the reference point (target). The location of the camera at the time when the camera photographed each of the still images is calculated by the exterior orientation parameter calculating unit 106. The coordinate system of the camera location is a coordinate system that describes the location of the camera. The locations of the feature points calculated by the feature point location calculating unit 109 and the locations of the targets selected by the operator are also described in the coordinate system of the camera location.

The coordinate system of the reference point is a coordinate system that describes the location of each of the multiple targets, which are preliminarily obtained. The coordinate system of the camera location and the coordinate system of the reference point are described by using the same map coordinate system (a coordinate system that uses ground coordinates; for example, a coordinate system that describes location information obtained by the GNSS). By integrating the coordinate system of the camera location and the coordinate system of the reference point (target location), a coordinate system (integrated coordinate system) is obtained for describing the location of the camera, the locations of the feature points, the locations of the targets selected by the operator, and the locations of targets unselected by the operator in the same coordinate system (map coordinate system).

The back-projected image generating unit 111 obtains a back-projected image in accordance with the principle shown in FIG. 3. The back-projected image may be obtained as follows. First, the camera location (viewpoint), and the coordinate position of each point in the integrated coordinate (real space coordinate) obtained by the coordinate integrating unit 110, are connected by a straight line. Then, each point is plotted in a still image at the position in which the straight line intersects the plane of the still image photographed from the camera location. For example, a case of obtaining a still image L1 at time t1 is assumed. In this case, a reference point (target location) in the integrated coordinate system and a camera location (viewpoint) at time t1 are connected by a straight line, and a point is added in the still image L1 at the position in which the straight line intersects the plane of the still image L1, whereby a back-projected image at time t1 is obtained.

The target position estimating unit 112 estimates the position of a target, which is not identified in the still image, by using the back-projected image. The target detecting unit 113 utilizes the result of the estimation and detects a target, which is still not identified at this stage, from the back-projected image.

The target appropriateness judging unit 114 judges whether the target, which was selected by the operator, and the target, which was detected by the target detecting unit 113, are appropriate. Inappropriate targets include a target that is mistakenly selected by the operator such that information is mistakenly input, a target that misdetected in step S112 (refer to FIG. 8) (in a case of detecting a wrong target), a target having an error in the location information as originally registered, a target having location data of low reliability due to various reasons, and an incorrect target which is not a target but was detected (such as an object, a pattern, etc. which was misrecognized as a target). In addition, there may be cases in which the location of a target is changed during photographing by wind, by being moved by a person, or the like. Such a target is also judged as an inappropriate target for the reference point.

The appropriateness of the target is judged by using the location information of the target, which is measured in stereo. That is, although the location information of the target identified in the image by the device is originally determined, the three-dimensional location of the target can be calculated by the principle shown in FIG. 6 from two still images (back-projected images) that are photographed in a consecutive manner or at very short time intervals. The target appropriateness judging unit 114 compares the calculated location and the originally obtained location relating to the location of the target (reference location) and judges the target as being inappropriate, that is, as an erroneous target, when the difference thereof exceeds a predetermined threshold value.

A specific example of the processing will be described hereinafter. First, a first back-projected image corresponding to a first still image and a second back-projected image corresponding to a second still image are assumed. Here, the two back-projected images are obtained from the two still images that were photographed at times close to each other and that include approximately the same object. By using the first back-projected image and the second back-projected image, the three-dimensional location of the detected target is calculated by the forward intersection method shown in FIG. 6. Then, the calculated three-dimensional location of the target is compared with the three-dimensional location of the same target as originally stored. At this time, if the difference exceeds a predetermined threshold value, the target is judged as an erroneous target.

The error-type judging unit 117 judges the type of error in the erroneous target by referring the predetermined types of errors, when an erroneous target is detected. The measure to solve the cause of the error is changed depending on conditions such that when the error occurred merely by misdetection, there may be some problems in the entirety of the device, there was an error in the original location information of the target, etc.

Figure 9:
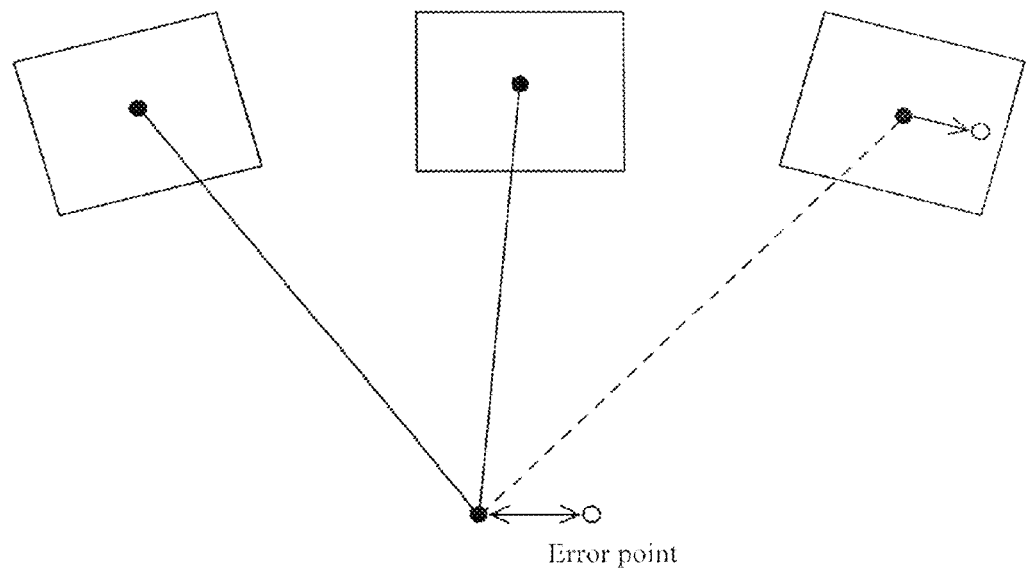
FIG. 9 is an explanatory diagram showing an example of an error.

For example, FIG. 9 shows a case in which the target location calculated by the method shown in FIG. 6 differs from the target location that is preliminarily obtained. In this case, there is a possibility that the operator performed an operation erroneously when selecting, and there is a possibility that a target was mistakenly detected. In addition, if the result shown in FIG. 9 is obtained while still images are processed in a time sequence, there is a possibility that the target was moved during the photographing.

Figure 10:
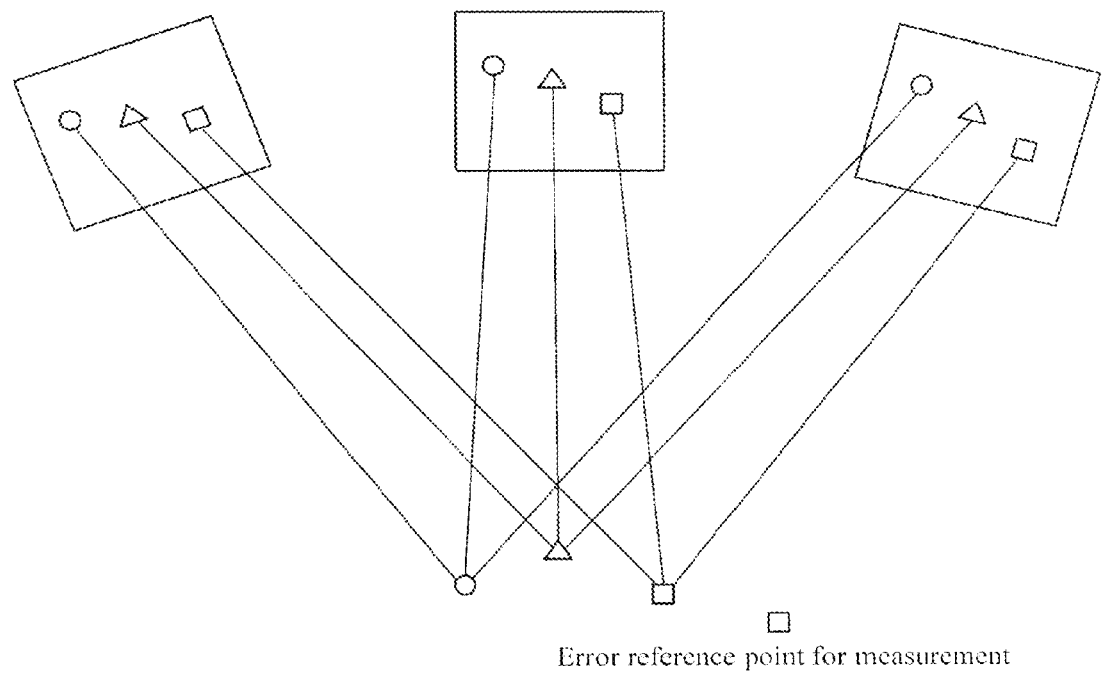
FIG. 10 is an explanatory diagram showing an example of an error.

FIG. 10 shows a case in which only one of multiple targets has a calculated value that is different from a known value. In this case, three-dimensional locations of the targets (reference points) calculated respectively from three still images coincide with each other. Therefore, there is a high possibility of an error in the location information of the target marked with the square mark, which is preliminarily obtained. The target location is preliminarily obtained by using a total station or a GNSS unit by which precise location information can be obtained. Nevertheless, there may be cases in which the target location is mismeasured due to misoperation of the device or incorrect detection of a navigation signal from a navigation satellite, whereby incorrect location information is obtained. In such a case, there is a high probability of obtaining the result as shown in FIG. 10.

On the other hand, if the calculated values differ from the originally stored values with respect to multiple targets, malfunction of the device may be expected. If the difference between the calculated value and the originally stored value varies with respect to multiple targets, malfunction of the device or a problem in the image analysis (for example, there is difficulty in extracting feature points because some of the still images are dark) may be expected.

Examples of types of errors will be described hereinafter. It should be noted that the type of error selected is not limited to one, and two or more types may be selected.

(1) Mistaken Input

The reference point may have been mistakenly input. Regarding a target selected by the operator, when the calculated value differs from the originally stored value only in this target, unlike other targets, as shown in FIG. 9, and the difference is excessively great, there is a possibility of mistaken input in selecting the target by the operator.

(2) Movement of Target Location Due to Some Effects During Photographing

For example, considering a specific target, there may be cases in which the calculated value and the originally stored value coincide with each other in calculation using a Nth still image and a (N+1)th still image, but differ from each other in calculation using a (N+10)th still image and a (N+11)th still image. In this case, there is a possibility of movement of the target in a (N+2)th or a subsequent still image.

(3) Malfunction of Device for Measuring Reference Point

The location of a target is initially identified by using a total station or the like and is thereby obtained. At this time, there may be cases in which the location is misidentified. For example, there may be a problem such that the device failed, the precision of the measured location information is low due to an unstable condition of receiving the navigation signal from the navigation satellite, the device was operated incorrectly, and the like. In this case, the calculated value and the originally stored value do not coincide with each other in a target in which such a problem occurred. In particular, the case as shown in FIG. 10 may occur due to this type of error.

(4) Fundamental Problem

When the calculated values and the originally stored values do not coincide with each other in general, or the calculated values do not converge, it can be expected that the device failed or a fundamental problem has occurred in the data.

(5) Low Reliability

There may be cases in which the reliability of the calculated result is unstable due to the reliability of data used, qualities of obtained still images, and the like. In this case, the operator may be required to decide whether to perform the placing of the reference point and the photographing again, whether to proceed with the processing by using only data with high reliability, etc.

For example, if there is a problem such that the detection accuracy of targets is decreased because the still images including a specific area are dark due to the weather or the like, the calculated locations tend to differ from the known locations regarding multiple targets detected in this area. A similar tendency can also be seen when the measurement precision of targets in a specific area is low. Such a situation may occur when the weather is bad during measurement of locations of targets in a specific area, whereby the precision was low, for example.

Moreover, a processing of changing an alarm level depending on the degree of the variation may be performed by evaluating variation of the difference between a target location (reference point location), which is calculated regarding a target detected in the specific area, and the target location preliminarily obtained. In this case, the alarm level may be set by classifying the variation at one of ranks of σ, 2σ, 3σ, or greater value of measurement resolution. The measurement resolution can be calculated from $\Delta xy = H \cdot \delta p/f$ and $\Delta z = H \cdot H \delta p/(f \cdot B)$, in which f represents a focal distance of a camera, B represents a moving distance of the camera, δp represents an image resolution, and H represents a photographing distance or a photographing altitude.

The three-dimensional model generating unit 115 generates a three-dimensional model constructed of multiple targets and many feature points, which are obtained by analyzing the numerous still images. For example, a TIN (Triangle Irregular Network) is generated by using the obtained feature points as point cloud position data, and a three-dimensional model of the photographed object is generated. Meanwhile, actual dimensions of the three-dimensional model obtained by the multiple targets are provided. The technique of generating a three-dimensional model based on point cloud position data may be found in Japanese Unexamined Patent Applications Laid-Open Nos. 2012-230594 and 2014-35702, for example.

The super-resolution processing unit 116 performs processing for enhancing the resolution of still images. In this embodiment, the super-resolution processing is performed as follows. First, when a target still image is selected, multiple images photographed prior to the selected image in a consecutive manner or at very short time intervals are selected. For example, multiple images of an (n−1)th still image, an (n−2)th still image, an (n−3)th still image, . . . are selected.

Although the same place was photographed in the still images, since the still images were obtained by photographing while moving, the angle of the optical axis relative to the photographed object slightly differs among the different still images even though the still images were photographed in a consecutive manner or at very short time intervals. Therefore, the angle difference of the optical axis relative to the photographed object is corrected by ortho processing. The details of the ortho processing may be found in "Technical Material of Geographical Survey Institute, Manual of Public Survey Work of Generating Digital Ortho Image, A•1-No. 289, published by the Geographical Survey Institute of Ministry of Land, Infrastructure, Transport, and Tourism of Japan in January 2004". The ortho processing is performed on each of multiple target images. After the ortho processing is performed, these multiple target images are superimposed one on another. At this time, each of the images is superimposed precisely by using reference points, which can be determined by the targets that are known at this stage, as positioning markers.

In the superimposed multiple still image, pixels constructing each of the still images are not perfectly superimposed in most cases, and the positions of the pixels slightly differ from each other. That is, in most cases, the pixels of the second still image exist in gaps between the pixels of the first still image. This is because the location of the camera photographing each of the still images varies. The shifts of the pixels are increased with the increase in the number of the superimposed images. Therefore, as the number of the superimposed images is increased, a dense image having smaller gaps between the pixels, that is, a high resolution image having a higher pixel density is obtained. By performing the super-resolution processing, the degree of blurring is decreased when the image is enlarged, and a high resolution image is obtained. As a result, by using the high resolution image, the detection accuracy of the target is improved.

Example of Processing

Figure 7:
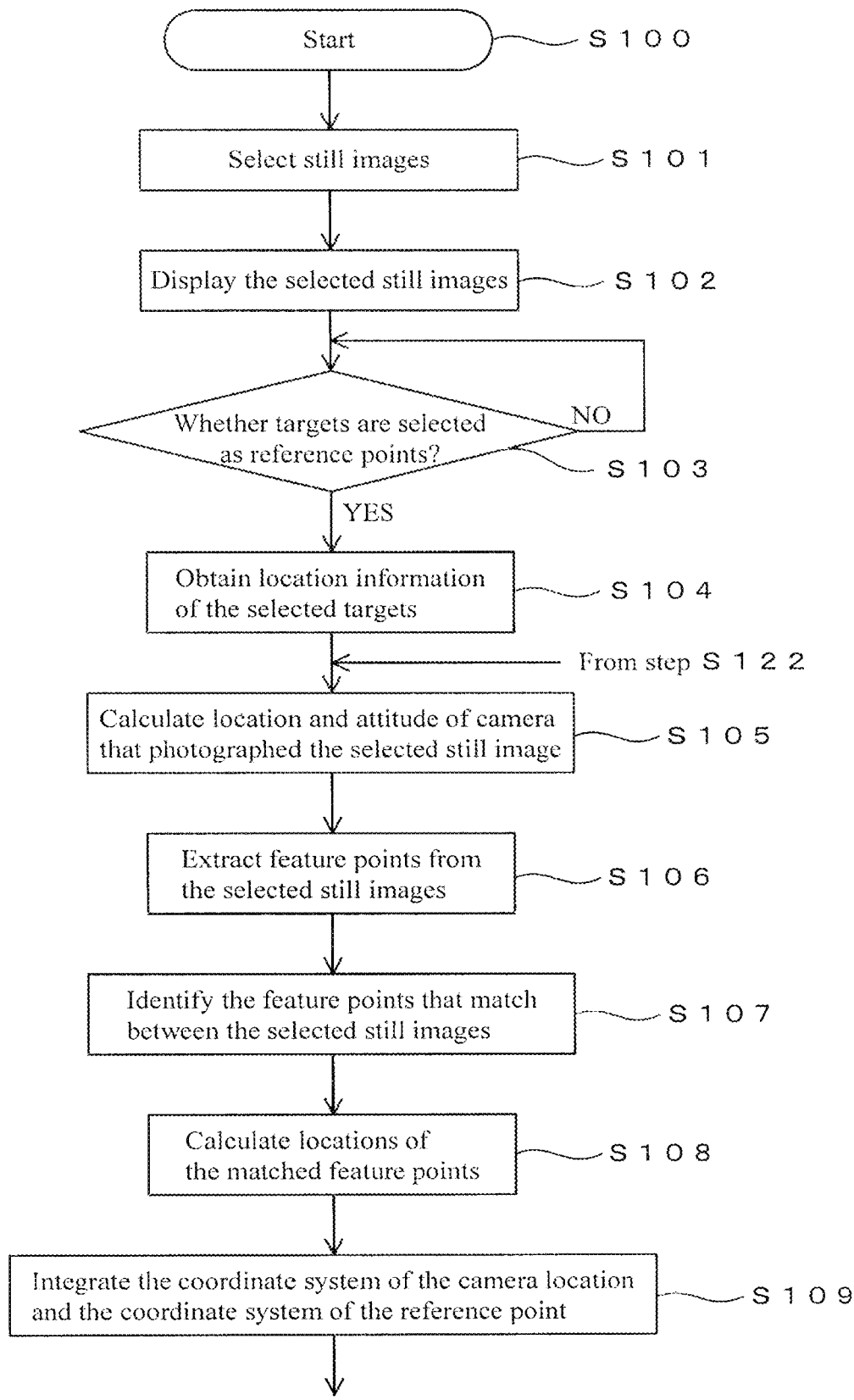
FIG. 7 is a flow chart showing an example of a processing procedure.
Figure 8:
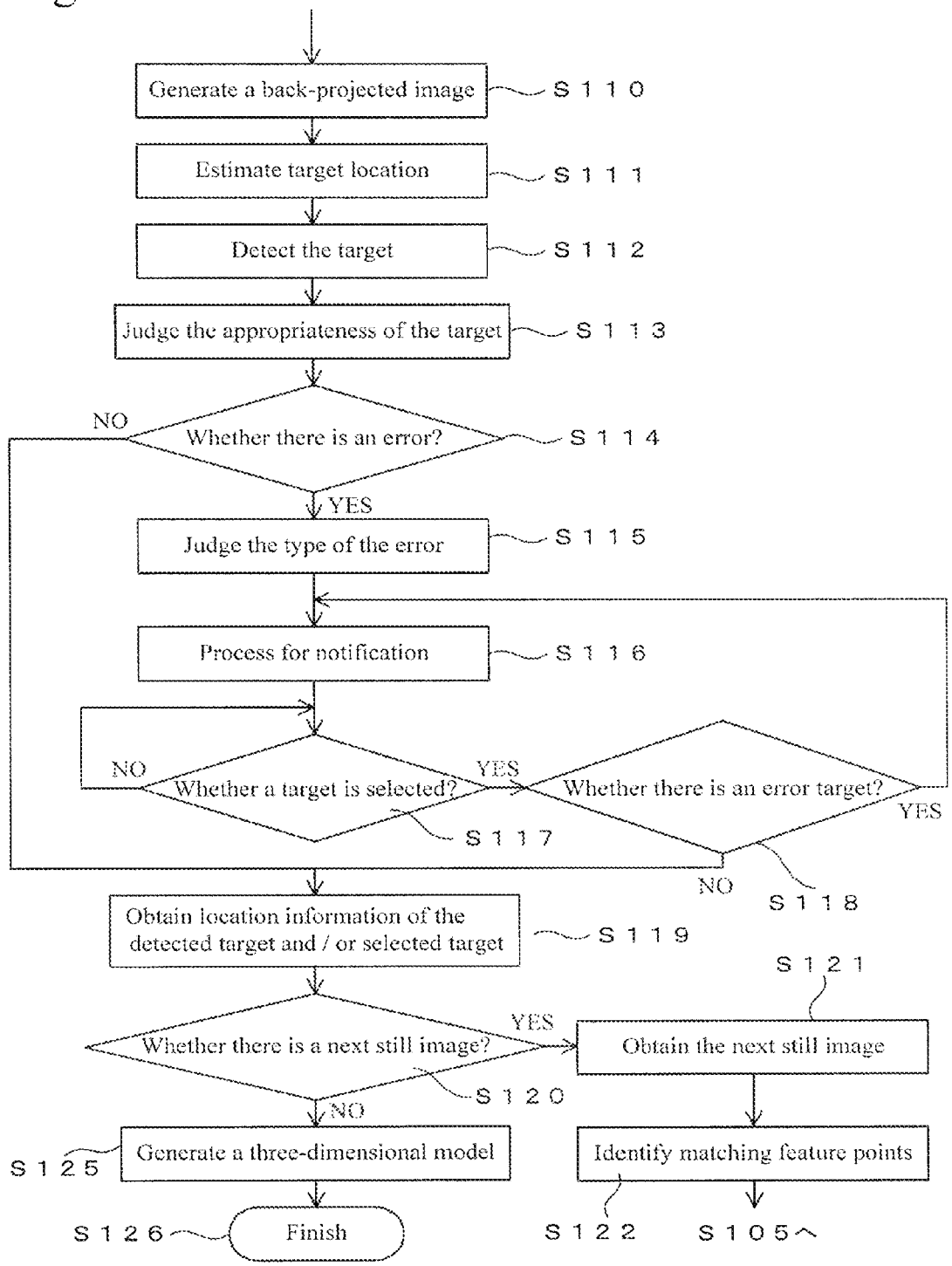
FIG. 8 is a flow chart showing an example of a processing procedure.

FIGS. 7 and 8 show an example of a procedure of the processing performed in the survey data processing device 100. The program for executing the processing of the steps shown in FIGS. 7 and 8 may be stored inside the survey data processing device 100 or in an outside appropriate storage area, and it may be read by the CPU of the survey data processing device 100 so as to be executed. The program can be stored in an appropriate storage medium. Here, a case is exemplified by not using location data and attitude data obtained by the UAV. Naturally, it is also possible to utilize the location data and the attitude data obtained by the UAV.

First, as preparation for the processing, a UAV is made to fly over an area of land to be measured, and still images of the land are photographed at a predetermined time interval by using a camera in the meantime. The photographing data is input in the survey data processing device 100. The camera has a clock function of measuring a reference time, and the photographing time is linked with the photographed still image in the photographing data.

When the processing is started (step S100), many photographed still images are thumbnailed in the time sequence order on a display viewed by the operator. The operator selects two still images photographed in a consecutive manner or at very short time intervals, from the thumbnails of the many still images (step S101). For example, two still images L1 and L2 photographed at time t1 and t2 (time t2 is later than time t1), respectively, are obtained. This operation content is received by the operation information receiving unit 104 shown in FIG. 2, and then the GUI controlling unit 102 executes processing corresponding to the operation content.

Then, the selected two still images are displayed (step S102). The operator looks at the two still images for at least four common targets contained therein and selects them. This step is performed by operating the computer that constructs the survey data processing device 100, by the operator, for example. It should be noted that the selected images should be changed if at least four common targets are not found.

The survey data processing device 100 judges whether four or more targets are selected for reference points (step S103). If four or more targets are selected, the location information of the selected targets is retrieved from the data storing unit 101 shown in FIG. 2 (step S104). Otherwise, the processing of the step S103 is repeated. The processing of the step S104 is performed by the target information obtaining unit 105 shown in FIG. 2.

After the step S104, the location and the attitude of the camera at the time when the camera photographed each of the two still images selected in the step S101 are calculated by using the backward intersection method shown in FIG. 4 (step S105). This processing is performed by the exterior orientation parameter calculating unit (exterior orientation parameter obtaining unit) 106 shown in FIG. 2. Specifically, as shown in FIG. 4, the location information of each of the four or more targets selected by the operator is represented by $P_1$, $P_2$, or $P_3$ (although three points are described in FIG. 4, four or more points are used in practice). Also, an image coordinate position of each of the targets in the still image is represented by $p_1$, $p_2$, or $p_3$ (similarly, although three points are described in FIG. 4, four or more points are used in practice). Then, the location O of the camera photographed the corresponding still image is calculated by the principle shown in FIG. 4. After the location O is calculated, the direction of the optical axis of the camera at the time when the camera photographed the corresponding still image is determined by the positional relationship between the points $p_1$, $p_2$, and $p_3$ and the image center of the still image, whereby the attitude of the camera at that time is determined. Thus, in the step S105, the exterior orientation parameters (location and attitude) of the camera at the time when the camera photographed each of the two still images selected in the step S101 are calculated.

Next, feature points are extracted from the two still images selected at this stage (step S106). This processing is performed by the feature point extracting unit 107 shown in FIG. 2 by software processing using a differential filter such as a Sobel filter, a Laplacian filter, a Prewitt filter, a Roberts filter, or the like. It should be noted that the extracted feature points may include targets.

Then, feature points (matching points) that match between the selected two still images are identified among the feature points extracted in the step S106 (step S107). This processing is performed by the matching point identifying unit 108 shown in FIG. 2 by using template matching, for example. Here, a processing of detecting mismatched feature points may also be performed. The technique of the processing of detecting the mismatched points may be found in Japanese Unexamined Patent Application Laid-Open No. 2013-186816, for example.

After the feature points that match between the selected two still images are identified, three-dimensional locations of the identified matching points are calculated (step S108). This processing is performed by the feature point location calculating unit 109 shown in FIG. 2. For example, the following case may be assumed. A still image L1 was photographed at time t1, and a still image L2 was photographed at time t2. In addition, the location and the attitude of the camera at time t1 and the location and the attitude of the camera at time t2 are already calculated in the step S105.

In this case, as shown in FIG. 6, the $poat_1$ is the location of the camera at time t1, the point $p_1$ is the position of a feature point P in the still image L1, the $poat_2$ is the location of the camera at time t2, and the point $p_2$ is the position of the feature point P in the still image L2. Here, a line connecting the points $O_1$ and $p_1$ and a line connecting the points $O_2$ and $p_2$ are set, and coordinates of an intersecting poatf the two lines are calculated, whereby coordinates of the feature point P are obtained. This calculation is performed on each of the identified feature points in the processing of the step S108.

After the step S108, the procedure advances to the step S109. In the step S109, the coordinate system describing the camera location obtained in the step S105 (coordinate system for the location of the camera) and the coordinate system describing the target location are integrated. As a result, the locations of the camera, the locations of the feature points calculated in the step S108, the locations of the targets selected or detected at this stage, and the locations of targets unselected or undetected at this stage, are described in one coordinate system. The locations of the camera and the locations of the feature points are described by using the map coordinate system, and the locations of the targets are preliminarily identified by using a total station or the like in the map coordinate system. Therefore, the coordinate systems thereof are integrated by adding the coordinates of the targets in the coordinate system of the camera location.

For example, in both of the first still image and the second still image, it is assumed that multiple common targets Ai (i=1, 2, 3, . . . ) and multiple common feature points Bj (j=1, 2, 3, . . . ) are identified, and three-dimensional locations thereof are obtained. Here, other targets Ck (k=1, 2, 3, . . . ), which are not identified in the first still image and in the second still image, have three-dimensional locations that are known (All targets are placed only after their three-dimensional locations are identified in the first place). Then, a real space, in which the multiple identified targets Ai (i=1, 2, 3, . . . ) and the multiple identified feature points Bj (j=1, 2, 3, . . . ) exist, is assumed, and the unidentified targets Ck (k=1, 2, 3, . . . ) are arranged therein. In this case, by integrating the coordinate system describing the targets Ai and the feature points Bj and the coordinate system describing the targets Ck, the targets Ck is described in the integrated one coordinate system.

After the coordinate system of the camera location and the coordinate system of the reference point are integrated, the procedure advances to the step S110. In the step S110, a back-projected image corresponding to one or both of the selected still images is generated. This processing is performed by the back-projected image generating unit 111 shown in FIG. 2. That is, locations of targets (unidentified targets), which are not obtained in the step S104 and are still not detected at this stage, are plotted as data in the integrated coordinate that is obtained in the step S109. Therefore, by back-projecting the integrated coordinate system at the viewpoint (camera location), at which a specific still image A is obtained, so as to generate a back-projected image, the targets Ck (k=1, 2, 3, . . . ), which are not detected in the still image A, are made to appear in the back-projected image.

After the step S110, a processing for estimating the location of the unselected target is performed by using the back-projected image (step S111). This processing is performed by the target position estimating unit 112 shown in FIG. 2. In this processing, the position of the unidentified target appearing in the back-projected image (undetected target in which the location information is not obtained in the step S104) is obtained as an estimated location of the target. That is, a processing of recognizing the position of the new target appearing in the back-projected image as an "estimated location" is performed in the step S111 because the new target may probably exist thereat according to the calculation.

After the location of the unidentified target is estimated, a processing of detecting this target is performed (step S112). The processing performed in the step S112 is described as follows. In this processing, first, a search area is set by enlarging the image of the vicinity of the estimated location of the unidentified target in the back-projected image. For example, the search area is selected as an area with approximately several meters to ten meters square including the unidentified target at the center thereof. The search area is an enlarged image obtained by enlarging a part of the still image. Thus, an area is set within the still image on the assumption that it must include the unidentified target.

Then, by focusing on the set search area, the unidentified target is detected by software processing. Targets are placed with, for example, a white filled circle containing a round mark at the center thereof, so as to be easily recognized in images, and are attached with a two-dimensional code (pattern for reading the code) for identifying the location thereof. These targets are to be detected in the search area by image analysis.

Specifically, reference images of the targets are stored in the data storing unit 101 shown in FIG. 2, and the new target is detected in the search area by using the reference image as a comparative image. This technique can be performed by using a publicly known image recognizing technique.

Additionally, a super-resolution processing may also be performed in the step S112. For example, the super-resolution processing is performed as follows. First, multiple still images photographed prior to the selected image in a consecutive manner or at very short time intervals are selected in the step S112. For example, multiple images of an (n−1)th still image, an (n−2)th still image, an (n−3)th still image, . . . are selected. The multiple still images are subjected to ortho-correction and are then superimposed one on another by positioning, whereby a superimposed still image is obtained. At this time, each of the images is superimposed precisely by using reference points, which can be determined by the targets that are known at this stage, as positioning markers. After the superimposed still image is obtained, an enlarged superimposed still image is obtained by enlarging the vicinity of the unidentified target of the superimposed still image. Thereafter, the unidentified target is detected in the enlarged superimposed still image by an image recognizing processing.

The detection of the unidentified target by the image processing performed in the step S112 has a possibility of causing misdetection of an object and a pattern that are similar to the unidentified target. The probability of this increases as the resolution is decreased. However, by performing the super-resolution processing, a distinctive image is obtained even when enlarged, whereby the detection accuracy of the identified target can be improved. This advantage is also obtained in the case of visual observation. Therefore, the super-resolution processing is also effective in the step S116, which is described later.

The processing in the step S112 is efficiently performed because the search area is limited. Thus, the unidentified target is detected from the still image without being operated by the operator. This processing is performed on all of the unidentified targets appearing in the back-projected image. It should be noted that there may be cases in which no target is detected in the step S112. In such a case, a processing for disregarding undetected targets can be performed, but alternatively, the operator can search for targets by displaying and looking at the search area. In this case, a notification of no detection of target is displayed, and a control for displaying an enlarged image of the search area, in which an estimated location of a target is marked, is performed. Accordingly, since the area to be looked at by the operator is limited, the burden on the operator can be relatively small.

After the new targets are detected, a processing for judging whether there are inappropriate targets (erroneous targets) among the detected targets is performed (step S113). In this processing, whether there are inappropriate targets among the targets selected by the operator is judged at the same time. This processing is performed by the target appropriateness judging unit 114 shown in FIG. 2. In this processing, three-dimensional locations of the detected targets are calculated by the forward intersection method shown in FIG. 6 by using the first back-projected image and the second back-projected image that are selected at this stage (selected in the step S101, for example). Next, the three-dimensional locations of the detected targets, which are calculated by the forward intersection method, are compared with the three-dimensional locations of the corresponding targets preliminarily stored. Then, if the difference exceeds a predetermined threshold value, the corresponding target is judged as an erroneous target.

If there is no erroneous target, the procedure advances to the step S119, and the location information of the detected targets is retrieved from the data storing unit 101. If there is an erroneous target, the type of the error is judged as described above (step S115). This processing is performed by the error-type judging unit 117.

Figure 15:
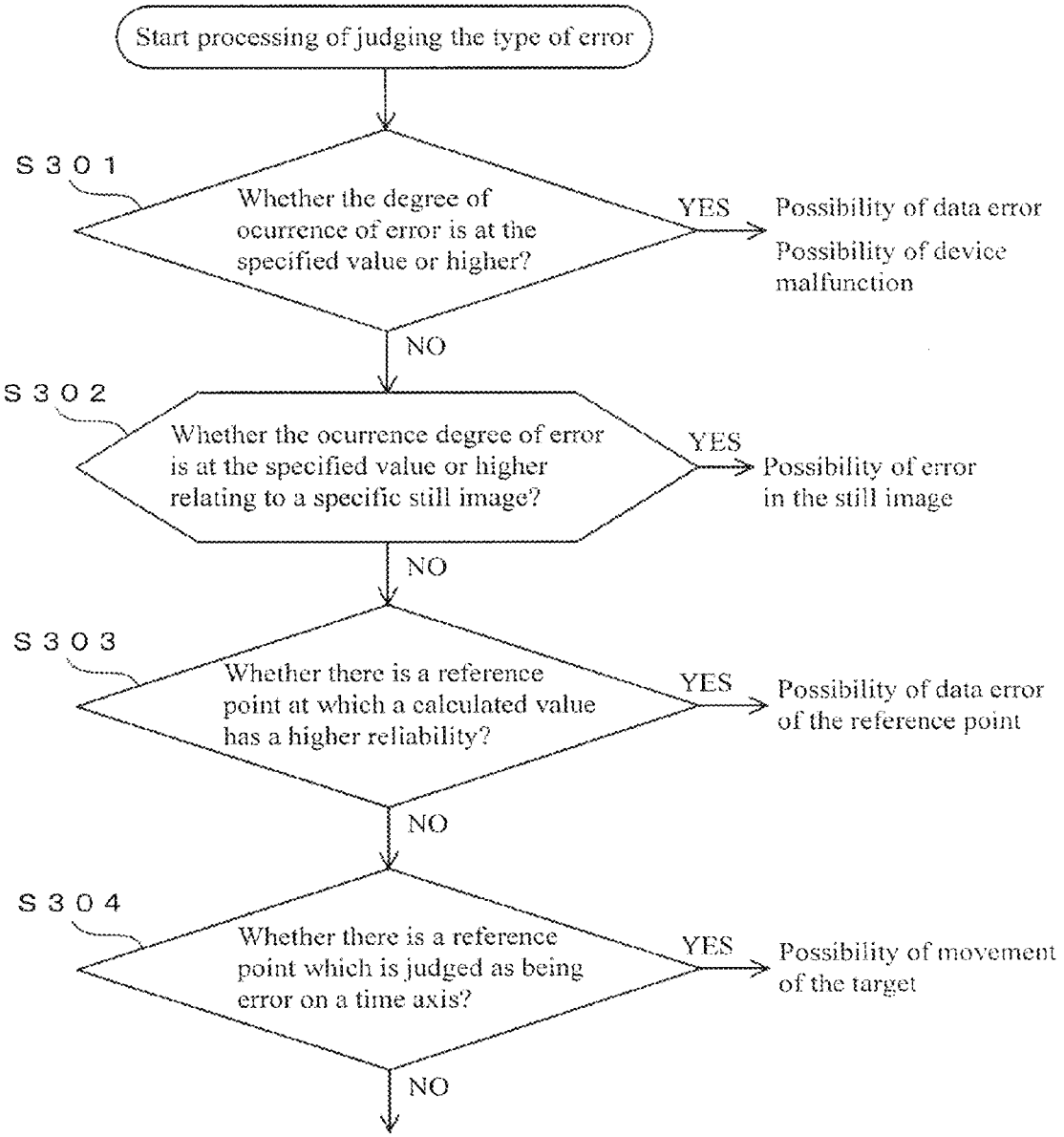
FIG. 15 is a flow chart showing an example of an error-type judging processing.

FIG. 15 shows an example of the processing procedure for judging the type of error. Several levels of specified values (threshold values) for the judgment may be prepared so as to be selected depending on the site condition. In the processing shown in FIG. 15, when the processing for judging the type of error is started, whether the degree of occurrence of the error is the specified value or higher is judged in the processing performed on multiple still images (step S301). In this step, for example, whether the degree of occurrence of the error is at a predetermined percentage or higher is judged. If the degree of occurrence of the error is high, it is suspected that there is a possibility of a problem in reliability and precision of data used, or there is a possibility of device malfunction. In this case, the possibility of a data error and the possibility of device malfunction are judged.

Next, whether the degree of occurrence of the error exceeds the specified value relating to a specific still image is judged (step S302). If the degree of occurrence of the error exceeds the specified value relating to a specific still image, the problem may be with the specific still image, such that the problem is in the contrast or the resolution. In this case, the possibility of error in the specific still image is judged.

Then, as in the case shown in FIG. 10, when the location of the reference point (target) that is preliminarily obtained does not coincide with the calculated value, and the calculated value based on the multiple still images is reliable, the reliability of the data of the reference point is suspected. Therefore, the possibility of the data error of the reference point is judged (step S303).

Next, whether there is an error reference poatn the time axis is judged (step S304). For example, considering a specific target, there may be cases in which the calculated value and the originally stored value coincide with each other in calculation using a Nth still image and a (N+1)th still image, but differ from each other in calculation using a (N+10)th still image and a (N+11)th still image. In this case, there is a possibility of movement of the target in a (N+2)th or a subsequent still image. Therefore, the possibility of movement of the target during photographing is judged.

Thereafter, a notification processing is performed (step S116). In the notification processing, existence of the target that is judged as being inappropriate, and the type of the error judged in the step S115, are notified. The notice is displayed on the display of the terminal used by the operator. This processing is performed by the GUI controlling unit 102 shown in FIG. 2.

For example, a list of the thumbnail images including the vicinity of the target that is judged as being inappropriate is displayed. When the operator selects a specific thumbnail image in the list of the thumbnail images, the selected image is enlarged and is displayed. For example, the search area is displayed as an enlarged image. The operator looks at the enlarged image for the inappropriate target. If the inappropriate target is found, the operator selects it by using the GUI. If there are multiple targets that are misdetected, this step is performed on each of the misdetected targets. Alternatively, this processing may be performed by merely notifying the existence of the misdetected target to the operator, and the list of the thumbnail images may be set so that the operator can select presence or absence of the display of the list. When a target is not detected in the vicinity of the estimated area, a processing of judging the area as a misdetected area may be performed. In this case, the misdetected area may be displayed on the screen by thumbnail. These processings are performed by the GUI controlling unit 102 shown in FIG. 2.

Figure 11:
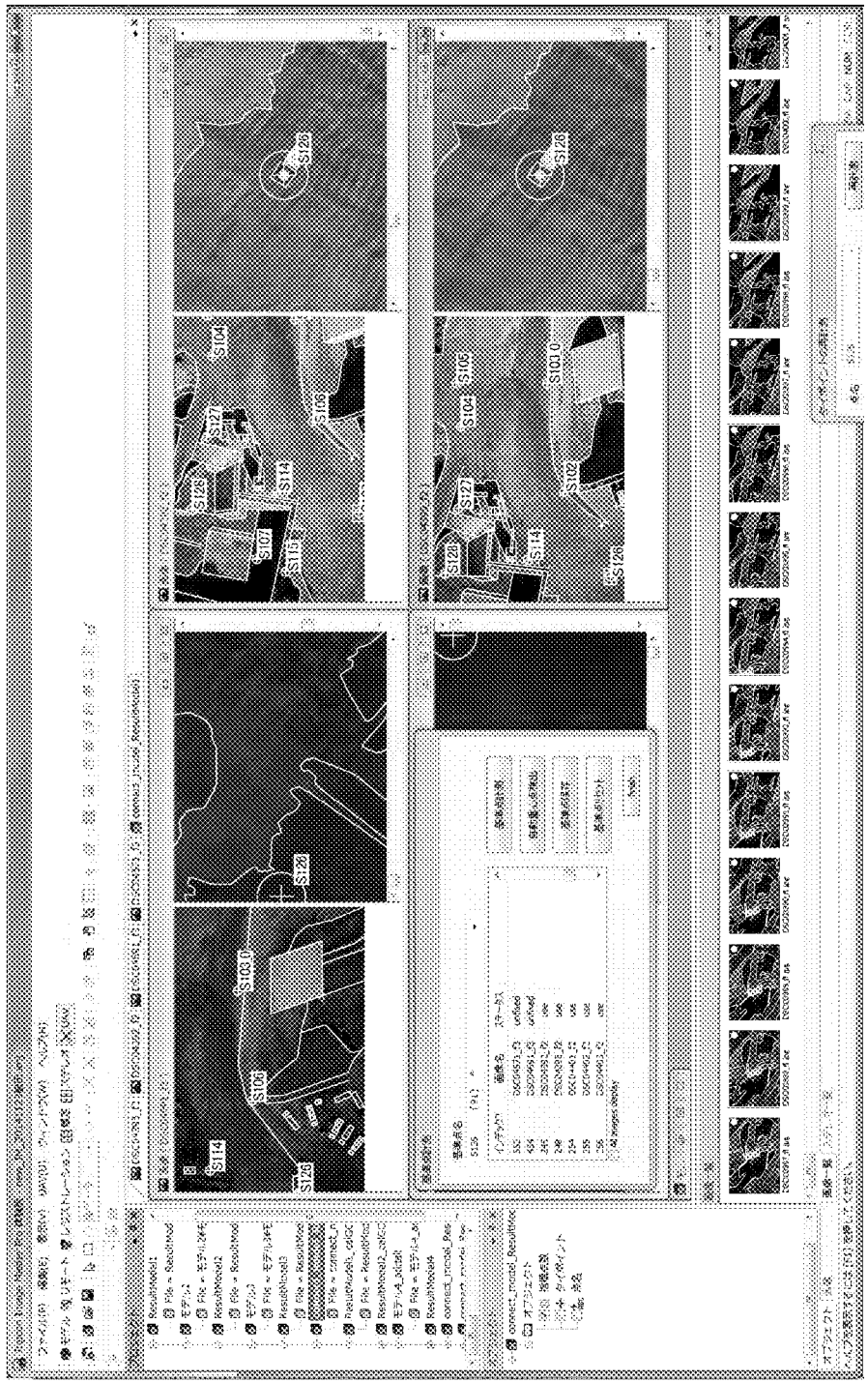
FIG. 11 is a view showing an example of a UI image.
Figure 12:
FIG. 12 is a view showing an example of a UI image.

FIG. 11 shows an example of a UI image containing thumbnail images, which contain targets judged as being inappropriate, enlarged images of the thumbnail images, and a list of the thumbnail images. According to this UI, when the operator selects a specific image, the selected image is enlarged, and an enlarged image of the search area is displayed. The operator looks at the enlarged images so as to confirm and correct the errors. In addition, FIG. 11 also shows a display (display of "unfixed") of information of the search area in which no target is detected. The operator can search for a target by eye by looking at the image of the search area in which no target is detected. FIG. 12 shows an example of a UI image containing a list of reference points in which there is a possibility of having a problem in measurement of the coordinates thereof or being selected by mistaken.

In the step S117, whether a new target is selected by the operator in the enlarged image that is displayed in the step S116 is judged. If a new target is selected, the procedure advances to the step S118. Otherwise, the step S117 is repeated. In the step S118, whether there is another erroneous target that is still not confirmed by the operator, that is, whether there is an image that is still not selected in the displayed list of the thumbnail images, is judged. If there is an image to be selected, the step S116 and the subsequent steps are repeated. Otherwise, the procedure advances to the step S119, and the location information of the target that is selected by the operator after the step S116 is obtained. The location information of the selected target is retrieved from the data storing unit 101 shown in FIG. 2 by the target information obtaining unit 105.

After the step S119, the procedure advances to the step S120. In the step S120, whether there is a subsequent still image is judged. If there is a subsequent sill image, the procedure advances to the step S121, and the subsequent still image is obtained. If there is no subsequent still image, a three-dimensional model is generated based on the feature points and the targets, of which three-dimensional coordinates are identified at this stage (step S125). The processing of the step S125 is performed by the three-dimensional model generating unit 115 shown in FIG. 2. After the three-dimensional model is generated, the processing is finished (step S126).

If the subsequent still image is obtained in the step S121, common feature points between the subsequent sill image and the still image immediately prior to the subsequent still image are identified (step S122). In this processing, first, feature points are extracted from the subsequent still image obtained in the step S121, in the same manner as in the step S106. Then, the feature points, which match between the subsequent still image and the still image immediately prior to the subsequent still image, are identified, in the same manner as in the step S107.

For example, the step S122 is performed as follows. Assuming that a third still image L3 is obtained in the step S121, common feature points between the second still image L2 and the third still image L3 are identified in the step S122. Here, the three-dimensional coordinates of the feature points extracted from the still image L2 are already calculated in the step S108. Therefore, the location of the common feature points between the still image L2 and the still image L3 identified in the step S122 are known at this stage.

After the step S122, the procedure advances to the step S105. Here, the location and the attitude of the camera (exterior orientation parameters of the camera) at the time when the camera photographed the still image obtained in the step S121 are calculated. The locations of the feature points, which match between the preceding still image and the still image obtained in the step S121, are determined at this stage. Accordingly, the location and the attitude of the camera at the time when the camera photographed the still image obtained in the step S121 is calculated by the principle shown in FIG. 4.

For example, assuming that a third still image L3 is obtained in the step S121, when the procedure advances from the step 122 to the step S105, the location and the attitude of the camera at the time when the camera photographed the still image L3 are calculated. An example of this processing is described below. First, positions of common feature points between the still image L3 and the still image L2 are represented by $P_1$, $P_2$, and $P_3$ in FIG. 4. In addition, positions of image coordinates of the feature points in the still image L3 are represented by $p_1$, $p_2$, and $p_3$. By setting three lines connecting $P_1$ and $p_1$, $P_2$ and $p_2$, and $P_3$ and $p_3$, respectively, the location of the camera photographing the still image L3 is at an intersection poat of the three lines. The extending direction of a line connecting the poat and the image center is the optical axis of the camera photographing the still image L3, and the attitude of the camera at the time when the camera photographed the still image L3 is obtained from the direction of the optical axis.

It should be noted that feature points, which are still not extracted at this stage (including new feature points that appear in the still image obtained in the step S121), are extracted in the processing of the step S106 with respect to the still image obtained in the step S121.

Thereafter, the processing of the step S107 and the subsequent steps is executed. Specifically, three-dimensional locations of the new feature points extracted from the still image obtained in the step S121 are calculated (step S108), and targets in the still image obtained in the step S121 are detected (step S112). That is, the processing of the step S107 and the subsequent steps is executed on the still image obtained in the step S121, in the same manner as in the case of the preceding still image.

Thus, regarding the Nth still image, the (N+1)th still image, the (N+2)th still image, and subsequent still images, feature points are extracted, and three-dimensional locations of the feature points are determined, and the targets are detected, respectively.

Thus, by calculating three-dimensional coordinates of the feature points in the multiple still images, a three-dimensional model constructed of the feature points is obtained. For example, data of a civil engineering worksite can be obtained by a three-dimensional model.

Figure 13:
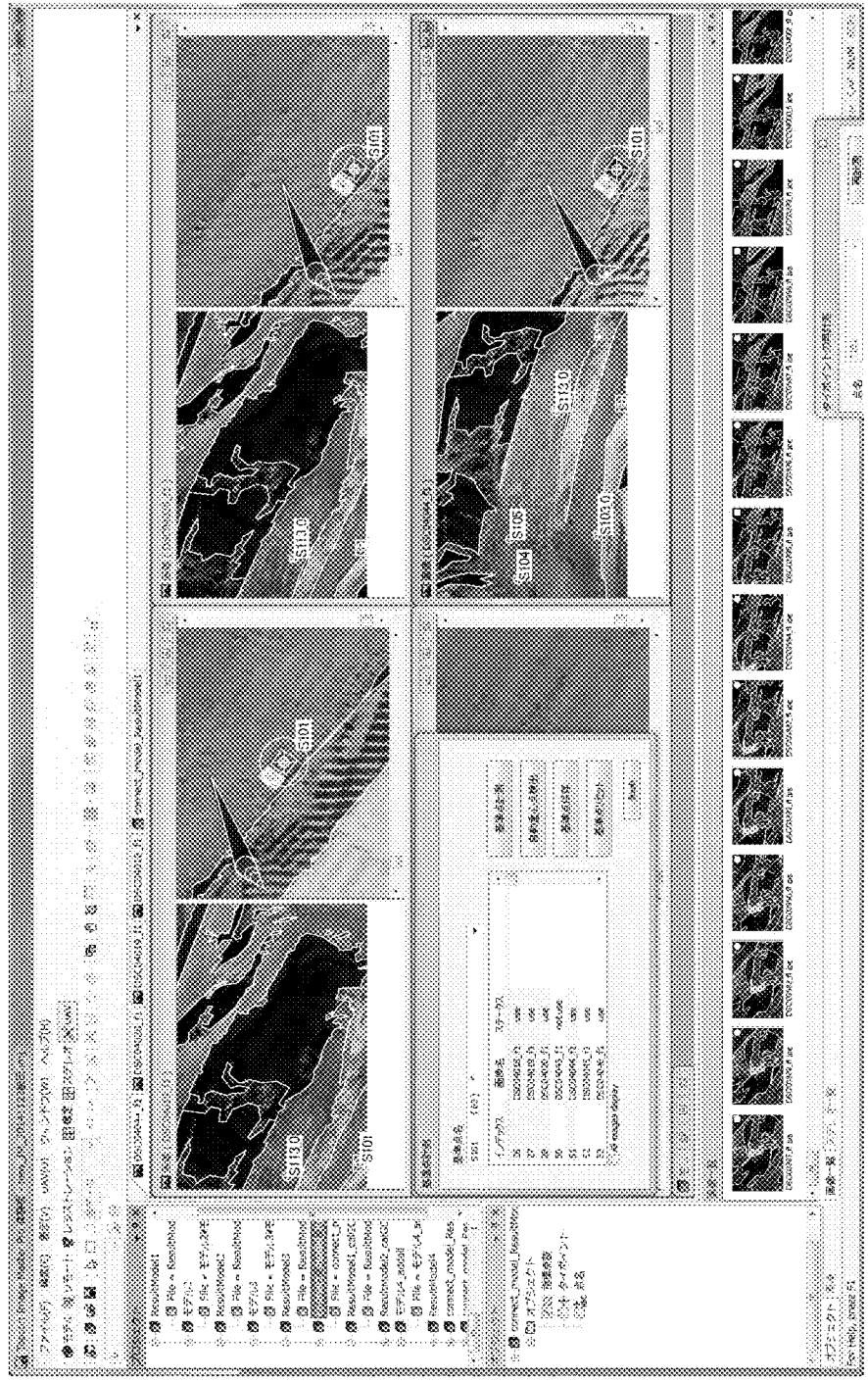
FIG. 13 is a view showing an example of a UI image.
Figure 14:
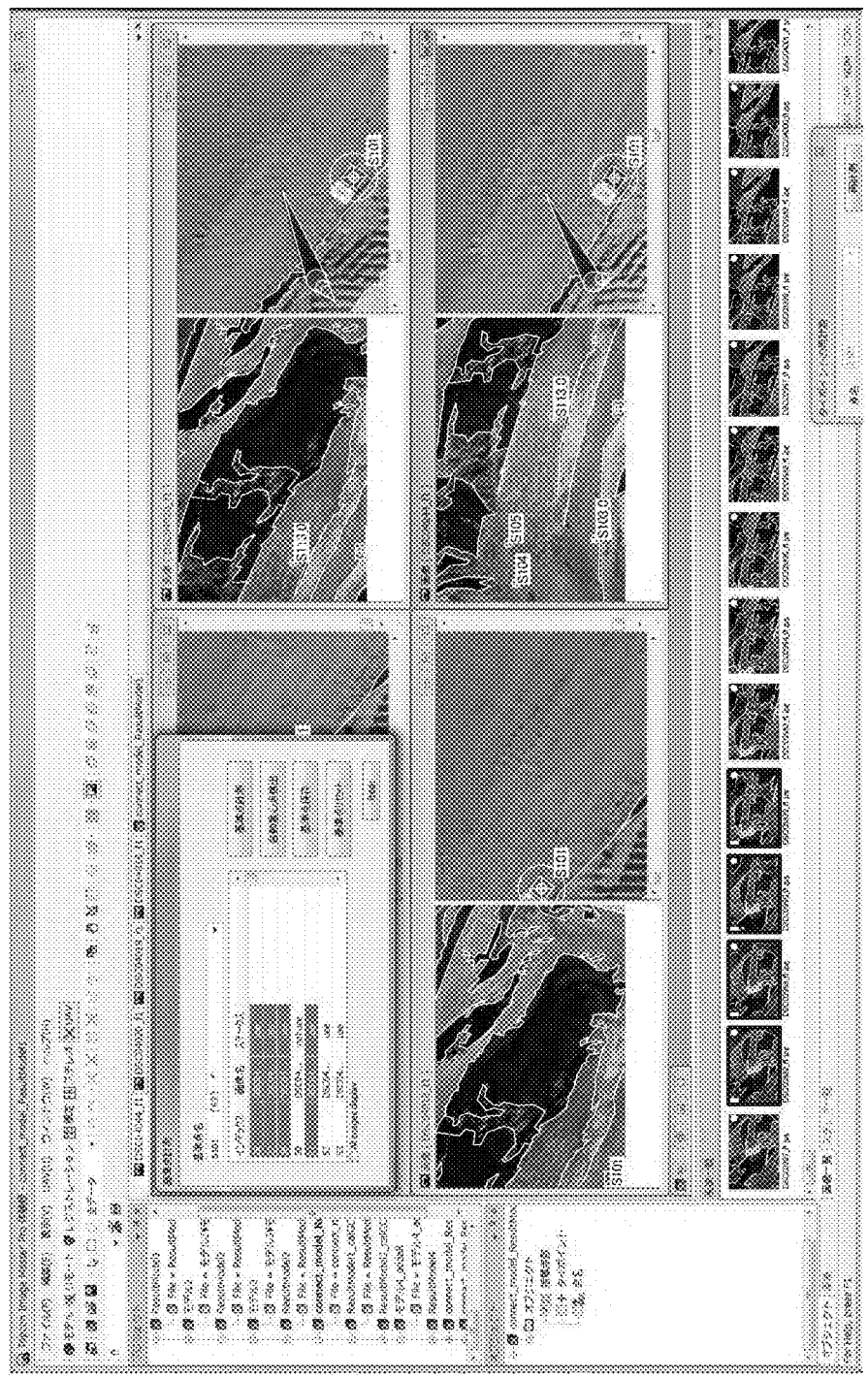
FIG. 14 is a view showing an example of a UI image.

In the above processing, a list of the targets obtained can be displayed at a timing as required by the operator. At this time, by selecting a specific target in the list, an enlarged image of the vicinity of the target is displayed. This processing is performed by the GUI controlling unit 102 shown in FIG. 2. FIGS. 13 and 14 show examples of UI display screens displaying a list of detected targets, a list of thumbnail images, and stepwisely enlarged images of the thumbnail images.

Advantages

If no erroneous target is detected, the operator only has to select targets in a first still image and a second still image.

Then, if an erroneous target is detected, the detection of the erroneous target is notified to the operator, and the operator confirms the appropriateness of the notified target and selects a target manually. Although this working step is the same as the conventional one, since relative locational relationships between feature points surrounding targets and the already selected targets are determined, the area to be looked for an unidentified target is limited, whereby the working step is easily performed. On the whole, the working steps for selecting targets manually are reduced, and the working procedure is much less complicated.

Other Matters

In other cases, when a UAV (Unmanned Air Vehicle), which can fly while measuring location information with high precision by a satellite positioning system or the like, is used, the location information obtained by the UAV may be used without performing the calculation of the camera location. Naturally, the camera location may be obtained by using both the location information, which is obtained by the UAV, and the location information, which is calculated based on the image analysis. In this case, a method of adapting an average value of the two kinds of the location information, a method of adapting a weighed average value by weighing, a method of adapting a value which is judged as having a higher precision depending on conditions, or the like, may be performed.

In the above embodiment, it is not necessary that the UAV fly autonomously, and the UAV may be configured to fly by remote control. It may be likely to use such a configuration depending on the cost, the kind of the UAV that can be prepared, the site condition, the scale of the measurement object, etc.

In another embodiment, a list of areas including locations which are estimated in the step S111 may be displayed by thumbnail images, and the operator may select a search area therefrom and detect targets by eye in the selected search area. In this case, although targets are not automatically detected, since the area to be looked for by the operator is limited, the burden on the operator is much reduced compared with a case in which a processing of limiting the search area is not performed. In particular, the visual detection of the targets is more easily performed by displaying the estimated locations of the targets in the enlarged display of the search area.

The technique described above can be utilized for techniques of detecting reference points from a photographed image. For example, the above technique can be utilized for techniques of calculating a moving route of a mobile body such as vehicles, aircraft, vessels, ships, etc. In this case, exterior orientation parameters of the mobile body are obtained by the processing in the step S105 in each still image, whereby the location of the mobile body at the time when the still image was obtained can be calculated. This processing can be performed in real time while travelling.

As the targets, road signs, structures of which locations are known, steel towers, various buildings, and constructed materials may be used. In addition, public roads, railway tracks, transmission lines, steel towers supporting transmission lines, and the like, may also be used as the targets, of which locations are known. The present invention may also be utilized in a case of using an image obtained by synthesizing images that are photographed by multiple cameras.

2. Second Embodiment

In the present invention, three-dimensional point cloud position data (or a three-dimensional model based on the three-dimensional point cloud position data), which is obtained by a total station with a camera or a laser scanner, may be used together. In this case, a first three-dimensional model is generated by the method described in the First Embodiment without using a reference point. Since a reference point is not selected in the first three-dimensional model, unlike the case of the First Embodiment, the first three-dimensional model is a relative model in which relative locational relationships among the feature points are identified.

Meanwhile, point cloud position data of the area which overlaps the area of the first three-dimensional model is obtained by using a total station with a camera and a laser distance measuring device (for example, refer to Japanese Unexamined Patent Application Laid-Open No. 2014-173990) or by using a laser scanner. Then, a second three-dimensional model is generated based on the point cloud position data.

Regarding the second three-dimensional model, when a total station with a camera is used, a three-dimensional model having a true scale is obtained. When a laser scanner is used, a three-dimensional model having a true scale is obtained in conditions in which a location of the scanner is preliminarily determined.

Then, the first three-dimensional model and the second three-dimensional model are matched with each other, whereby a matching relationship therebetween is obtained. For example, conditions for matching with the second three-dimensional model are searched for by enlarging, reducing, rotating, and parallel moving the first three-dimensional model. When the matching relationship therebetween is determined, a true scale is added to the first three-dimensional model. According to this method, the working step for selecting the reference points by the operator can be omitted.

3. Third Embodiment

The reference point to be selected first may be automatically detected by image recognition in the First Embodiment. In this case, reference targets, which are very easily recognized by the image recognition, are placed at multiple positions (four or more positions) to be photographed in both of two still images that are to be selected first. The installation places of the reference targets are determined considering the conditions of the ground surfaces, and the like, of backgrounds so that the images of the reference targets are easily recognized. The targets except for the reference targets are arranged as in the case of the First Embodiment.

In this embodiment, targets are detected from the still images, which are selected in the step S102, by software processing. Thereafter, processing similar to that in the First Embodiment is performed. In this embodiment, although targets to be detected first must be special targets, which can be easily detected automatically, it is not necessary to perform the working step for selecting targets first by the operator, which must be performed in the case of the First Embodiment. In this embodiment, also, as the targets, road signs, structures of which locations are known, steel towers, various buildings, constructed materials, public roads, railway tracks, transmission lines, steel towers supporting transmission lines, and the like, may be used.

What is claimed is:

1. A survey data processing device configured to detect multiple targets, of which locations are preliminarily identified, from an image, the device comprising: a processor programmed, or dedicated hardware configured, to perform as a data receiver that receives data of a first still image and data of a second still image, the first still image and the second still image being obtained by photographing the same object by a camera at a first timing and at a second timing respectively, while the camera travels, the second timing being later than the first timing; a selection receiver that receives a selection of respectively, while the camera travels, the second timing being later than the first timing; a selection receiver that receives a selection of some of the multiple targets, which are included in both the first still image and the second still image; an exterior orientation parameter calculator that calculates exterior orientation parameters of the camera at the first timing and exterior orientation parameters of the camera at the second timing, based on the selected-targets; a coordinate integrator that integrates a coordinate system of-an unselected target and a coordinate system of a location of the camera, which is calculated by the exterior orientation parameter calculator, so as to obtain an integrated coordinate system for describing the location of the unselected target and the location of the camera in the same coordinate system; a back-projected image generator that back-projects the unselected target in the integrated coordinate system, to the location of the camera at a specific position, thereby obtaining a back-projected image; and an estimator that estimates a position of the unselected-target in a still image that is photographed by the camera at the specific position, based on the position of the unselected target in the back-projected image on a screen; wherein the device performs processing for setting a search area by enlarging an area containing the location of the unselected target, which is estimated by the estimator, wherein the processor is further programmed, or the dedicated hardware is further configured, to perform as a determiner that judges a target as an erroneous target when a difference between known location data of the target detected in the search area and location data of the target, which is calculated from multiple still images by an intersection method, satisfies a predetermined condition; and the survey data processing device performs processing of evaluating variation of the difference and changing an alarm level depending on a degree of the variation.

2. The survey data processing device according to claim 1, wherein the survey data processing device performs processing for notification of an error in the detection when the detection is not performed normally.

3. The survey data processing device according to claim 2, wherein the survey data processing device performs control of displaying the corresponding search area on the screen when the detection is not performed normally in the search area.

4. The survey data processing device according to claim 1, wherein the survey data processing device performs control of display of multiple search areas on the screen by thumbnail images as reduced images and to perform control of displaying an enlarged image of the corresponding search area on the screen when one of the reduced images is selected.

5. The survey data processing device according to claim 1, wherein the processor is further programmed, or the dedicated hardware is further configured, to perform as an error-type determiner that judges the type of error occurring in the erroneous target.

6. The survey data processing device according to claim 5, wherein the difference is calculated with respect to multiple targets, and a predetermined specific type of error is selected when the variation in the differences of the multiple targets satisfies a predetermined condition.

7. The survey data processing device according to claim 5, wherein a predetermined specific type of error is selected based on change in the difference on a time axis.

8. The survey data processing device according to claim 5, wherein the survey data processing device controls displaying of the type of the error on the screen.

9. A survey data processing method for detecting multiple targets, of which locations are preliminarily identified, from an image, the method comprising: receiving data of a first still image and a second still image, which are obtained by photographing the same object by a camera at a first timing and a second timing receiving selection of some of the multiple targets, which are included in both the first still image and the second still image; calculating exterior orientation parameters of the camera at the first timing and exterior orientation parameters of the camera at the second timing based on the targets; integrating a coordinate system of an unselected-target and a coordinate system of a location of the camera, of which exterior orientation parameters are calculated, so as to obtain an integrated coordinate system for describing the location of the unselected target and the location of the camera in the same coordinate system; generating a back-projected image by back-projecting the unselected target in the integrated coordinate system, to the location of the camera at a specific location; and estimating a position of the unselected target in a still image, which is photographed by the camera at the specific location, based on the position of the unselected target in the back-projected image on a screen; and setting a search area by enlarging an area containing the location of the unselected target, using the estimated position and judging a target as an erroneous target when a difference between known location data of the target detected in the search area and location data of the target, which is calculated from multiple still images by an intersection method, satisfies a predetermined condition; and the survey data processing method performs processing of evaluating variation of the difference and changing an alarm level depending on a degree of the variation.

10. A non-transitory computer-readable medium storing computer-executable program codes, the computer-executable program codes comprising program code instructions for a survey data detecting multiple targets, of which locations are preliminarily identified, from an image, the program code instructions, when executed by a computer, perform steps including: receiving data of a first still image and a second still image, which are obtained by photographing the same object by a camera at a first timing and a second timing that is later than the first timing, while the camera travels; receiving a selection of some of the multiple targets, which are photographed in both of the first still image and the second still image; calculating exterior orientation parameters of the camera at the first timing and exterior orientation parameters of the camera at the second timing based on the selected-targets; integrating a coordinate system of unselected target and a coordinate system of a location of the camera, of which exterior orientation parameters are calculated, so as to obtain an integrated coordinate system for describing the location of the unselected target and the location of the camera in the same coordinate system; generating a back-projected image by back-projecting the unselected target in the integrated coordinate system, to the location of the camera at a specific location; and estimating a position of the unselected target in a still image, which is photographed by the camera at the specific location, based on the position of the unselected target in the back-projected image on a screen wherein the computer executable program performs processing for setting a search area by enlarging an area containing the location of the unselected target using the estimated position wherein the program is further programmed, to perform as a determiner that judges a target as an erroneous target when a difference between known location data of the target detected in the search area and location data of the target, which is calculated from multiple still images by an intersection method, satisfies a predetermined condition; and the program performs processing of evaluating variation of the difference and changing an alarm level depending on a degree of the variation.

* * * * *